United States Patent
Abu-Orf et al.

(10) Patent No.: US 7,163,629 B2
(45) Date of Patent: Jan. 16, 2007

(54) SYSTEM AND METHOD FOR ENHANCED WASTEWATER TREATMENT

(75) Inventors: Mohammad Abu-Orf, Pitman, NJ (US); Charles D. Blumenschein, Pittsburgh, PA (US); John T. Novak, Blacksburg, VA (US); Christopher D. Muller, Blacksburg, VA (US); Mark Laquidara, Framingham, MA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 138 days.

(21) Appl. No.: 10/901,342

(22) Filed: Jul. 28, 2004

(65) Prior Publication Data

US 2005/0040103 A1    Feb. 24, 2005

Related U.S. Application Data

(60) Provisional application No. 60/490,976, filed on Jul. 28, 2003.

(51) Int. Cl.
  *C02F 3/28* (2006.01)
  *C02F 1/36* (2006.01)

(52) U.S. Cl. .................. 210/603; 210/614; 210/173; 210/195.3; 210/259; 210/748; 210/916

(58) Field of Classification Search ............... 210/603, 210/631, 916, 173, 175, 194, 195.3, 252, 210/259, 614, 905, 748
See application file for complete search history.

(56) References Cited

U.S. PATENT DOCUMENTS

| | | | | |
|---|---|---|---|---|
| 2,198,737 A | * | 4/1940 | Petersen | 210/603 |
| 4,985,149 A | * | 1/1991 | Ohshima et al. | 210/603 |
| 2004/0256314 A1 | * | 12/2004 | Schmid et al. | 210/603 |

FOREIGN PATENT DOCUMENTS

| | | | |
|---|---|---|---|
| DE | 4204607 A1 | | 8/1993 |
| DE | 19502856 A1 | | 8/1996 |
| EP | 0220647 A1 | | 5/1987 |
| JP | 6-206092 | * | 7/1994 |
| JP | P2003-154388 | * | 5/2003 |

* cited by examiner

*Primary Examiner*—Fred G. Prince
(74) *Attorney, Agent, or Firm*—Coats & Bennett, P.L.L.C.

(57) ABSTRACT

Enhanced wastewater treatment utilizing directed energy to promote degradation of sludge is disclosed. The directed energy is delivered in a stream circulating to and from an anaerobic digester. The directed energy incorporates mechanical shear energy, ultrasonic energy, and/or hydraulic shear energy. Characterization of odor potential is further disclosed involving the analyzing volatilized sulfur-containing species from dewatered sludge. The odor potential can be used to control operation of the wastewater treatment by controlling the directed energy and/or polymer dose.

30 Claims, 18 Drawing Sheets

Note: the number following the letter represent separate samples from the same plant

SYSTEM AND METHOD FOR ENHANCED WASTEWATER TREATMENT

CROSS REFERENCE TO RELATED APPLICATION

This application claims priority under 35 U.S.C. § 119(e) from the following U.S. provisional application: Application Ser. No. 60/490,976 filed on Jul. 28, 2003. That application is incorporated in its entirety by reference herein.

BACKGROUND OF THE INVENTION

1. Field of the Invention

The present invention relates generally to wastewater treatment and, more particularly, to utilizing shear energy to promote breakdown of solid constituents of a wastewater stream.

2. Discussion of the Related Art

Wastewater typically comprises solid and liquid constituents. Systems and methods for treating wastewater typically comprise separation of such liquid and solid constituents, the latter typically predominantly organic species that can become waste activated sludge. Some systems and methods further provide treatment of waste activated sludge that reduce the overall solids volume for disposal. For example, Knauer et al., in U.S. Pat. No. 6,578,780, teach a method for the disintegrating sewage sludge with mechanical disintegration steps upstream of a decomposition step. The mechanical disintegration method destroys aggregates of cells and suspended materials in a first disintegration step and a separate second disintegration step. The first disintegration step utilizes a rotating wing device and the second disintegration step utilizes an ultrasonic homogenizer.

BRIEF SUMMARY OF THE INVENTION

In accordance with one or more embodiments, the present invention provides a method of treating wastewater. The method can comprises steps of introducing wastewater into an anaerobic digester, recirculating a portion of the wastewater from the anaerobic digester as a recirculating stream, and applying directed energy to the recirculating stream.

In accordance with one or more embodiments, the present invention provides a wastewater treatment system. The wastewater treatment system can comprise a secondary treatment system, an anaerobic digester fluidly connected downstream of the secondary treatment system, a circulation loop fluidly connected to the anaerobic digester, and a directed energy system in fluid communication with the circulation loop.

In accordance with one or more embodiments, the present invention provides a method of determining an odor potential of wastewater sludge. The method can comprise steps of disposing the wastewater sludge in a vessel, volatilizing any sulfur-containing species from the wastewater sludge, retrieving a sample of volatilized sulfur-containing species, and analyzing the sample to determine the odor potential.

Other advantages, novel features, and objects of the invention will become apparent from the following detailed description of the invention when considered in conjunction with the accompanying drawings, some of which are schematic and are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE SEVERAL VIEWS OF THE DRAWINGS

Non-limiting embodiments of the present invention will be described by way of example with reference to the accompanying drawings in which.

DETAILED DESCRIPTION OF THE INVENTION

Figure 1:
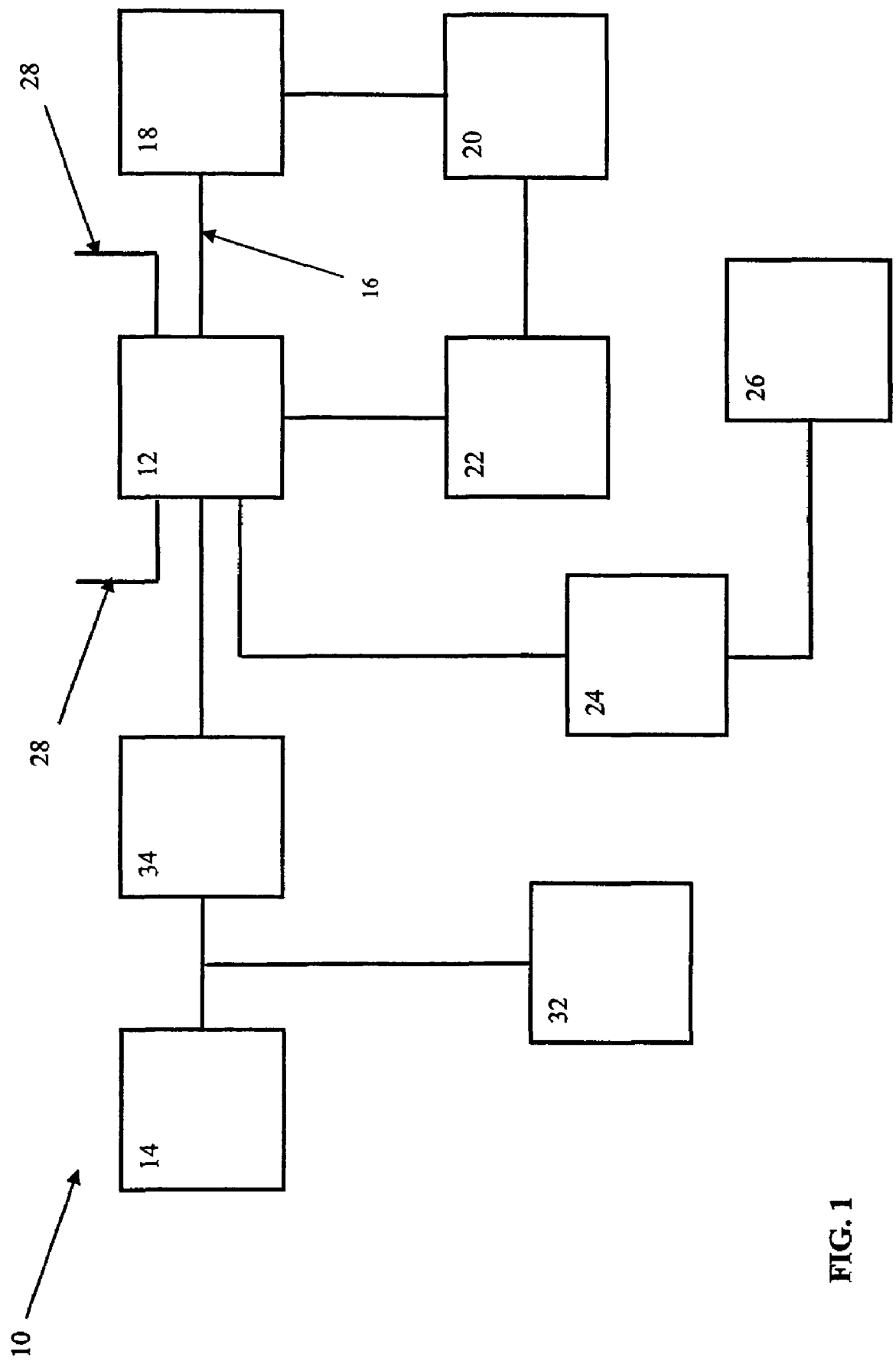
FIG. 1 is a flow diagram of a portion of a wastewater treatment system in accordance with one or more embodiments of the present invention.
Figure 1A:
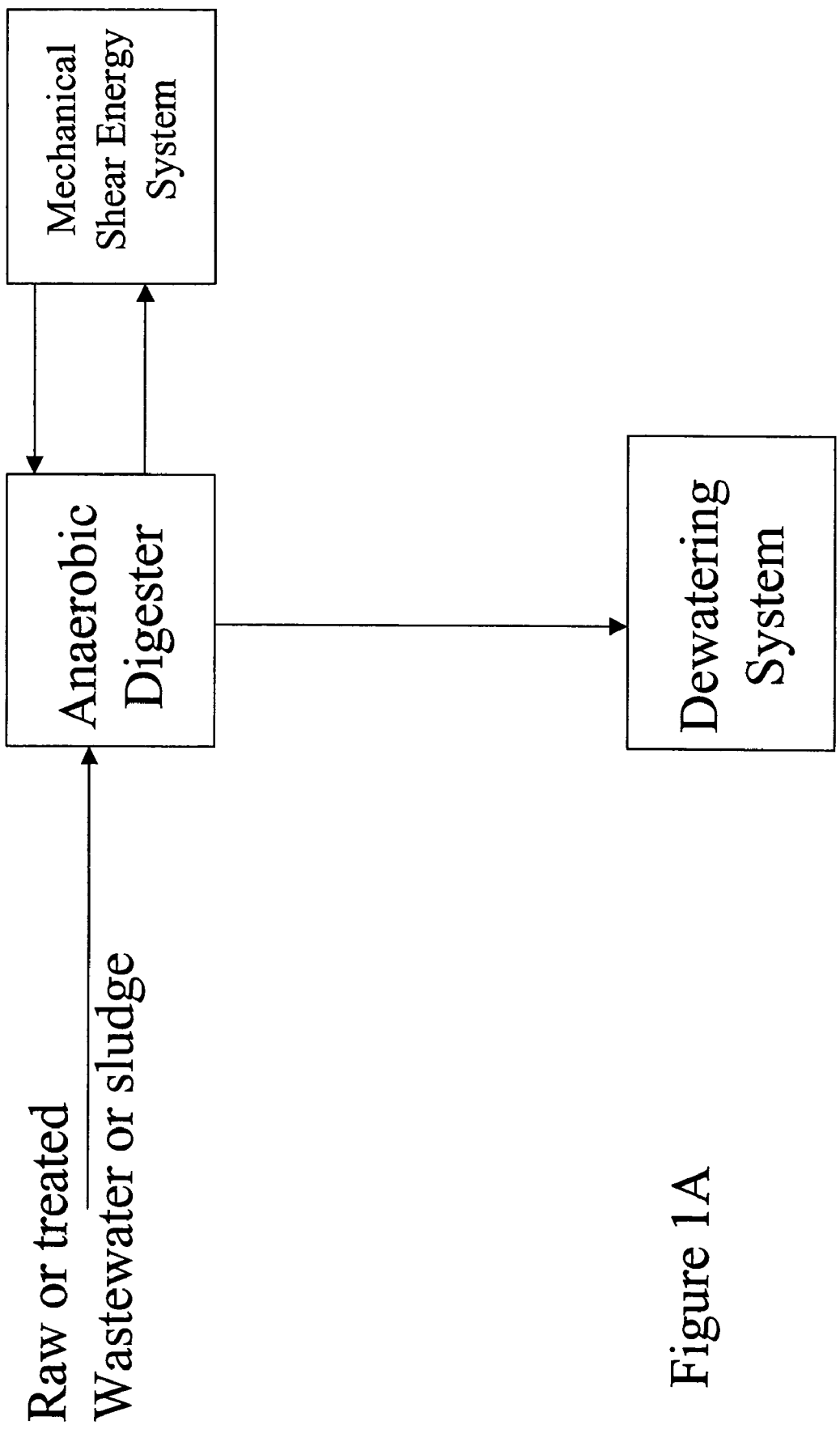
FIG. 1A is a schematic illustration of a wastewater treatment system including an anaerobic digester having a recirculation loop and a mechanical shear energy system.
Figure 1B:
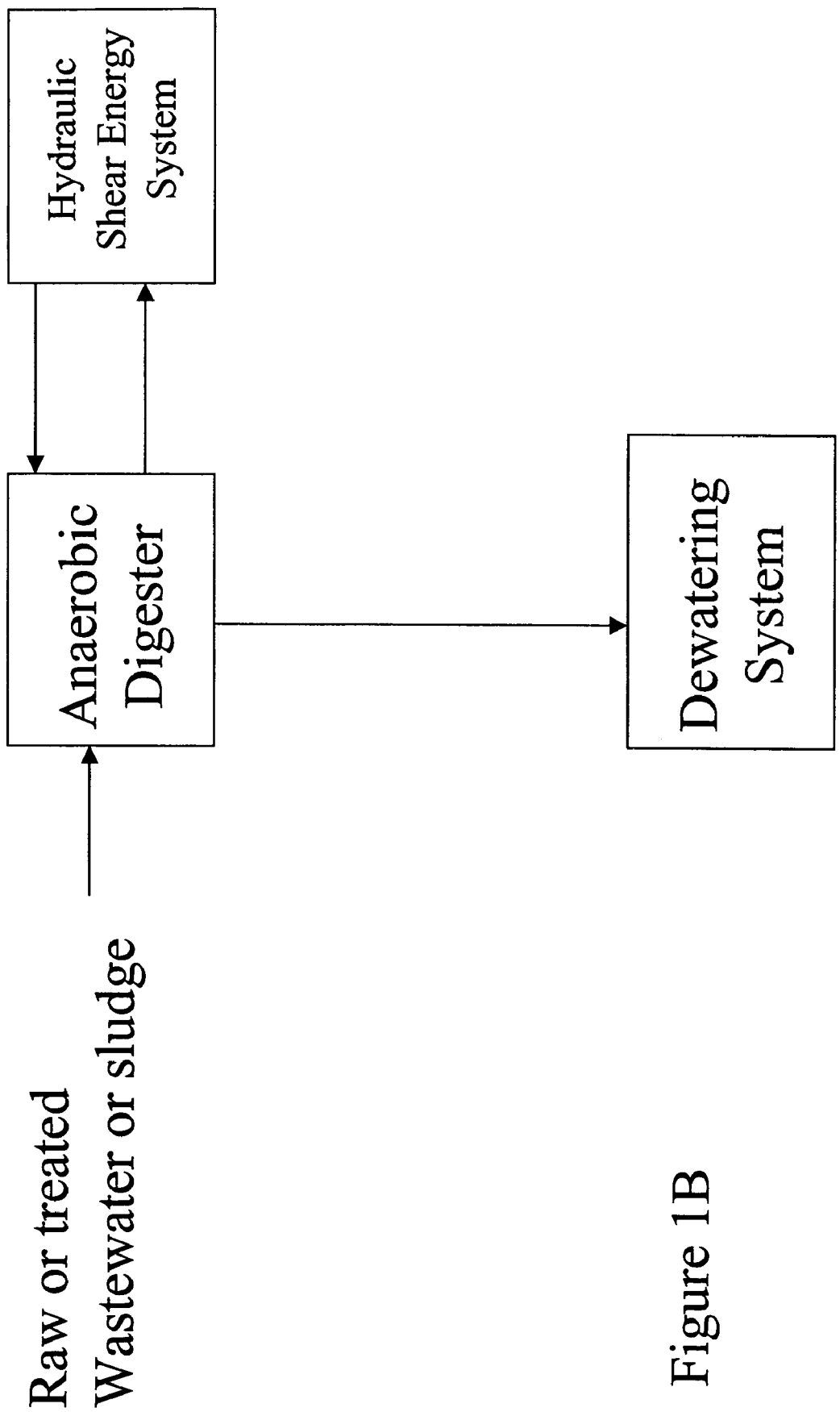
FIG. 1B is a schematic illustration of a wastewater treatment system including an anaerobic digester having a recirculation loop and a hydraulic shear energy system.
Figure 1C:
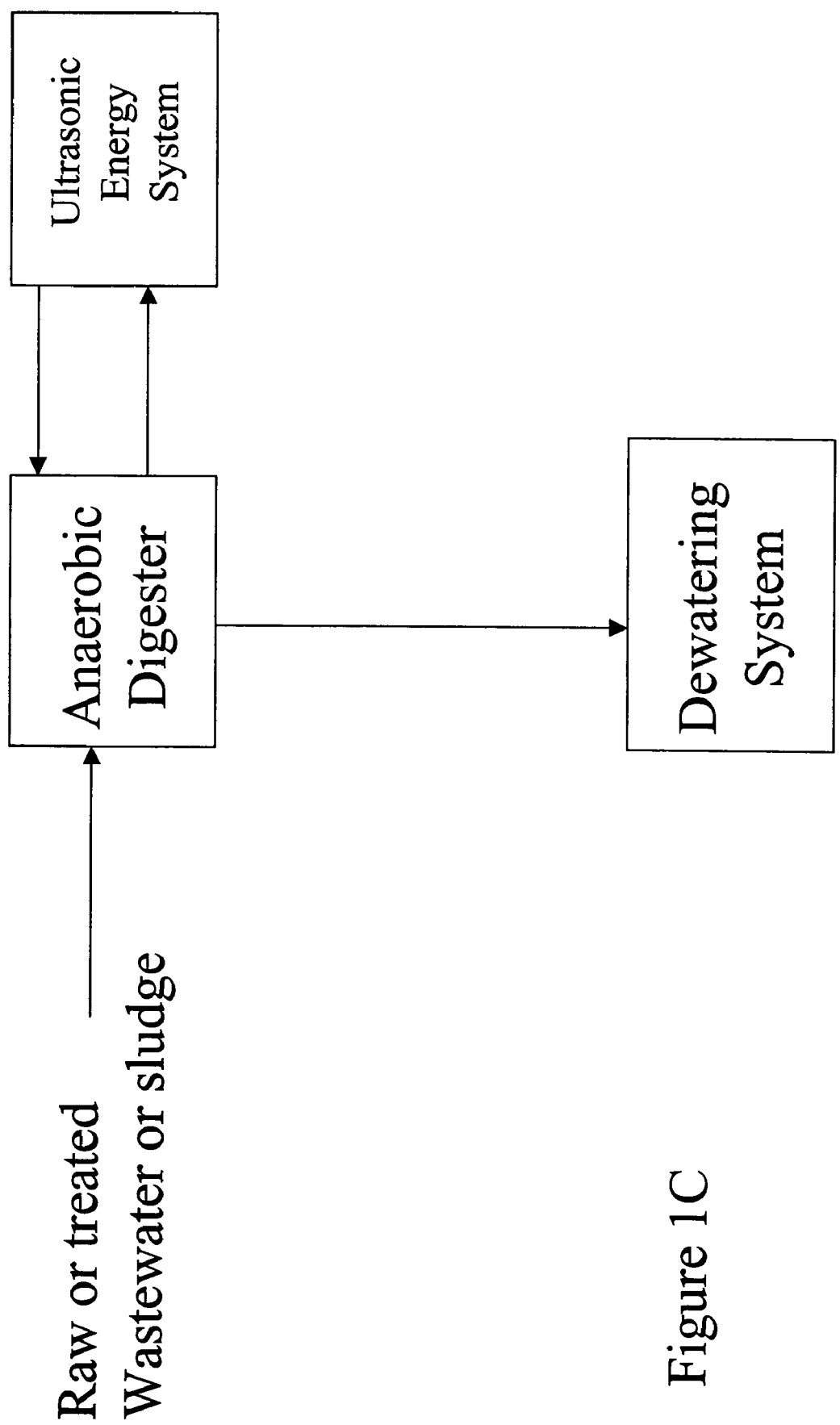
FIG. 1C is a schematic illustration of a wastewater treatment system including an anaerobic digester having a recirculation loop and an ultrasonic energy system.

In accordance with one or more embodiments, the present invention provides a wastewater treatment system. The wastewater treatment system typically comprises a secondary treatment system and an anaerobic digester fluidly connected downstream of the secondary treatment system. The anaerobic digester typically comprises a circulation loop inlet, a circulation loop outlet, a gas collection outlet, a liquid-rich stream outlet, and a solids-rich stream outlet. The wastewater treatment system can further comprise a circulation loop fluidly connected to the circulation loop inlet and the circulation loop outlet and a mechanical shear energy system in fluid communication with the circulation loop. The wastewater treatment system can further comprise an ultrasonic energy system in fluid communication with the circulation loop. The wastewater treatment system can still further comprise a heat exchanger in thermal communication with the circulation loop as well as a hydraulic shear energy system in fluid communication with the circulation loop. In some embodiments, the wastewater treatment system includes a primary treatment system fluidly connected upstream of the anaerobic digester. In still further embodiments, the wastewater treatment system further comprises a dewatering system connected downstream of the anaerobic digester at the solids-rich outlet.

In accordance with other embodiments, the wastewater treatment system of the present invention can comprise an odor potential measurement system in communication with the dewatering system. The odor potential measurement system typically comprises an analyzer such as a gas chromatograph/mass spectrometer as well as a solid phase micro-extraction method and other similar techniques for analysis.

In accordance with one or more embodiments, the present invention provides a method of treating wastewater. The method can comprise steps of introducing wastewater into an anaerobic digester, recirculating a portion of the wastewater from the anaerobic digester as a recirculating stream, and applying at least one of ultrasonic, mechanical, and hydraulic shear energy to the recirculating stream. The method can further comprising a step of heating the recirculating stream. The method can also comprise a step of dewatering at least a portion of a solids-rich stream from the anaerobic digester to produce a solids cake as well as measuring an odor potential of the solids cake The method can further comprise a step of controlling application of the at least one of ultrasonic, mechanical, and hydraulic shear energy as a function of the measured odor potential. In other embodiments, the method can further comprise a step of applying a polymer treatment dose to the wastewater as well as a step of controlling application of the polymer treatment dose as a fiction of the measured odor potential.

In accordance with one or more embodiments, the wastewater treatment system can further comprise an energy control system that can receive a signal from an odor potential measurement system and transmit a signal to at least one of a mechanical shear energy system, an ultrasonic energy system, and/or a hydraulic shear energy system. The control system typically comprises a controller, which can comprise a microprocessor having an algorithm that analyzes input signals from a sensor or other measurement system, and provides an output signal, which typically is based on the input signal. In accordance to one or more embodiments, the input signal can correspond to the determined odor potential and the output signal can provide control, such as, but not limited to actuation or deactivation, of one or more components. Those skilled in the art would realize that several control schemes can be incorporated in the algorithm of the present invention including, for example, feedback, feedforward, or fuzzy logic and/or proportional, integral, differential control or any combination thereof. As used herein, the phrase based on refers to a control technique that provides an output signal dependent on an input signal to provide a desired response. For example, a control system can provide an output controlled variable signal based on a difference of a measured parameter from a predetermined set-point value.

In accordance with one or more embodiments, the present invention can provide a method of determining an odor potential of wastewater sludge. The method can comprise steps of volatizing any sulfur-containing species from wastewater sludge and retrieving a sample of volatilized sulfur-containing species and analyzing the sample to determine the odor potential. The step of analyzing the sample can comprise performing a mass spectral analysis which typically provides an indication or a correlation of the volatilized sulfur-containing species to the odor potential.

Wastewater treatment systems typically include a primary treatment system and a secondary treatment system. The primary treatment system typically involves screening to remove large objects or solids, sedimentation to allow settling of solids entrained in the wastewater as well as to allow floatation of organic fluids. The secondary treatment system typically utilizes biological treatment processes wherein microorganisms convert by, for example, digestion, of nonsettling solids to settleable solids, which are typically predominantly composed of organic compounds. Secondary treatment digestion can be performed aerobically or anaerobically. For example, secondary treatment can involve digestion by microorganisms, such as bacteria, that digest organic material with or without aeration and agitation and/or recirculation to and from the digestion container or basin. In other systems, secondary treatment can comprise filtering through media comprising microorganisms that break down organic matter in the wastewater. In other cases, secondary treatment can involve decomposition of organic material in lagoons having microorganisms. After primary and secondary treatment, wastewater is usually disinfected using chlorine with or without other disinfecting compounds or techniques such as ozone or ultraviolet light treatment. In some cases, wastewater treatment system utilize tertiary treatment systems which can be physical, biological, or chemical intended to remove other contaminants, such as inorganic compounds.

As used herein, the term activated sludge typically refers to sludge material produced during the growth of microorganisms in aerated tanks typically as a part of the activated sludge process to treat wastewater. Decomposition is the process of breaking down into constituent parts or elements. Sludge refers to any solid, semisolid, or liquid material that can settle to the bottom of tanks.

In accordance with one or more embodiments and illustratively shown in the flow diagram in FIG. 1, the present invention provides a wastewater treatment system 10 comprising an anaerobic digester 12 typically fluidly connected to a secondary treatment system 14 such that wastewater can flow from secondary treatment system 14 into anaerobic digester 12. Anaerobic digester 12 can provide for decomposition of organic material digestive action of microorganism contained therein. Anaerobic digester 12 typically includes a circulation loop 16 having one or more unit operations, represented by 18, 20, and 22. Circulation loop 16 typically includes a pump or other transfer apparatus (not shown) serving to provide motile force to promote flow of a circulating stream flowing in circulation loop 16. The circulating stream typically includes material from the anaerobic digester and typically includes solids that can include organic material or compounds. Such organic material may be in the form of filaments, strands and/or cellular aggregates. Anaerobic digester 12 typically includes one or more outlets 28 and 30 for, for example, venting of any gas, such as methane, generated during the decomposition process occurring within the anaerobic digester. Outlets for streams that are predominantly liquid-rich can also be provided.

Wastewater treatment system 10 can further comprise a dewatering system 24 typically fluidly connected to the anaerobic digester 12 such that a predominantly solids rich stream from the anaerobic digester 12 can be further processed to remove liquid, typically water, and produce a solid cake, which can be disposed in a landfill or by incineration. Wastewater treatment system 10 can further include primary treatment systems 32, shown in FIG. 1 as fluidly connected upstream of anaerobic digester 12. Other optional unit operations can include a thickener system 34 providing further liquid removal prior to anaerobic processing.

Unit operations 18, 20, and 22 can introduce or remove energy from the wastewater flowing in circulation loop 16. For example, any one of unit operation 18, 20, and 22 can comprise a heat exchanger that is constructed and arranged to provide or remove thermal energy, i.e. heat or cool, the circulating stream. Those skilled in the art would readily understand that various types of heat exchangers can be utilized and that the selection of the particular type of heat exchanger would depend on several factors including, but not limited to, the composition of the wastewater stream, the cost of installation and operation of the heat exchanger as well as the amount of heating, or cooling, required.

Further, any one of unit operations 18, 20, and 22 can provide directed energy into the circulating stream. For example, any one of unit operations 20 and 22 can impart mechanical shear energy, hydraulic shear energy, and ultrasonic energy, or a combination thereof. Thus, in accordance with one or more embodiments, the present invention can provide a wastewater system incorporating a directed energy system comprising at least one of a mechanical shear energy system, a hydraulic shear energy system, and an ultrasonic energy system. As used herein the term directed energy does not include thermal energy of the type that would be applied by a heat exchanger. The term directed energy will include mechanical shear energy, hydraulic shear energy, ultrasonic energy and any other form of energy that mechanically applies energy to the sludge.

The directed energy system can provide high specific energy density to the wastewater, such as the circulating stream comprised of wastewater, to promote degradation of any solid materials comprising the wastewater. In accordance with one or more embodiments of the present invention, directed energy can be delivered to a stream of wastewater circulating to and from the anaerobic digester to promote disintegration of sludge such that larger-sized constituents are divided into smaller constituents that can be further digested by microorganisms. Such directed energy systems typically serve to break sludge floc, or aggregates thereof, and, at least to some degree, solubilizes or promotes solubility of organic matter or make biodegradable matter comprising the floc more available to anaerobic bacterial decomposition. In some cases the directed energy can lyse cells to promote access for further bacterial degradation or otherwise provide cell rupture. Thus, in some cases, size reduction and solubilization that may be a consequence of the applied directed energy can enhance performance as measured by, for example, improved gas production, typically methane, and improve volatile solids (VS) reduction, leading to less residual material for downstream processing and disposal. In some cases, the size reduction and/or solubilization of the organic material can enhance treatment system performance because, it is believed, that the associated floc breakdown and/or solubilization occurs more favorably within an anaerobic environment under conditions wherein any iron ions would be present in a reduced state in the floc environment, which can make the floc weaker. That is, the present invention can be advantageously incorporated under conditions when iron ions would be in the reduced state such as during anaerobic digestion. Thus, in accordance with one or more embodiments, the techniques of the present invention can be advantageously incorporated into a circulation stream to and from an anaerobic digester. It is also believed that the quantity and quality of delivered directed energy can affect the degree of floc breakdown and/or solubilization, and hence the degree of enhancement of the treatment process.

In accordance with one or more embodiments, the present invention provides a directed energy to promote degradation of sludge by applying one or more of mechanical shear energy, hydraulic shear energy and ultrasonic energy into a stream circulating to and from an anaerobic digester. For example, the directed energy system can include at least one of a mechanical shear energy system and an ultrasonic energy system in series or parallel flow in the circulating stream. In other embodiments, the directed energy system comprises at least one of a mechanical shear energy system and a hydraulic shear energy system in series or parallel flow in the circulating stream. In yet other embodiments, the directed energy system comprises at least one of an ultrasonic energy system and a hydraulic shear energy system in series or parallel flow in the circulating stream. In still other embodiments, the directed energy system comprises a mechanical shear energy system, an ultrasonic energy system, and a hydraulic shear energy system in series or parallel flow in the circulating stream. In accordance with one or more embodiments of the present invention, the directed energy system can comprise any one of a mechanical energy system, a hydraulic energy system and an ultrasonic energy system. In some embodiments in accordance with the present invention, directed energy systems may be inclusive or exclusively limited to any two of an ultrasonic energy, mechanical shear energy or hydraulic shear energy. In other embodiments, the directed energy system can be inclusive or exclusive of one of an ultrasonic energy system, a mechanical energy system or a hydraulic energy system.

The mechanical shear energy system in accordance with the present invention can comprise any system or apparatus that provides forces to create mechanical stress that breaks down or promotes breakdown of the sludge aggregates or even the cells comprising the sludge. The mechanical shear energy can be delivered to the sludge by mechanical apparatus that imparts shear forces, preferably locally. In accordance with one or more embodiments of the present invention, the mechanical shear energy systems can utilize glass and/or metallic beads or balls. The size and type of beads utilized can vary from about 0.2 to about 5 mm in diameter, depending on, among other factors, the desired amount of energy delivered, the type of sludge and the size and extent of aggregation of the floc. Examples of systems and apparatus that can provide mechanical shear energy include ball mills such as those commercially available from, for example, Netzsch Inc., Exton, Pa., from CB Mills, Gurnee, Ill., and from Chemco Systems, L.P., Monongahela, Pa.

The mechanical directed energy system can also comprise systems and apparatus that shred and/or pulverize the floc material. Examples of systems and apparatus that can provide mechanical shredding and/or pulverizing include rotor mills or cutting mills such as those available from Retsch GmbH & Co. KG, Haan, Germany. Other similar systems that may be suitable and provide mechanical directed energy as shredding include those from KADY International, Scarborough, Me.

The hydraulic shear energy system in accordance with the present invention can comprise any system or apparatus that provides hydraulically induced stress that breaks down or promotes breakdown of sludge material. In some cases the hydraulic shear energy system can pressurize the sludge-containing stream to high pressures, preferably up to about 45,000 psi and also provide release of such pressure that promotes cavitation induced shear conditions. The release of high pressure can be effected across, for example, an orifice or a plurality of orifices. The cavitation-induced shear forces can thereby destroy floc material as well as cell structures. Those skilled in the art would recognize that the principles of the present invention can be embodied in any manner that achieves the desired effect of applying hydraulic shear energy. For example, a variety of pressurizing techniques can be utilized to generate the high pressures described above including, for example, the use of any kind of pump suitable for the service. Further, those skilled in the art would also recognize that the pressure release can be effected by utilizing any orifice size suitable for the particular service and that the determination thereof would require routine experimentation.

The ultrasonic energy system in accordance with the present invention can comprise any system or apparatus that can deliver high-intensity sound energy, preferably locally, to induce cavitation to cause disintegration of floc as well as cellular materials. The ultrasonic energy can be delivered at a variety of sound frequencies but is typically about 20 kHz. Such systems and apparatus have been described in, for example, International Publication Nos. WO 03/038350 and WO 03/051531, each hereby incorporated herein by reference. Examples of ultrasonic energy apparatus include those commercially available as SONIX™ ultrasound apparatus from Sonico North America, Lakeside Marblehead, Ohio, and from Dukane Corporation, St. Charles, Ill.

Figure 2:
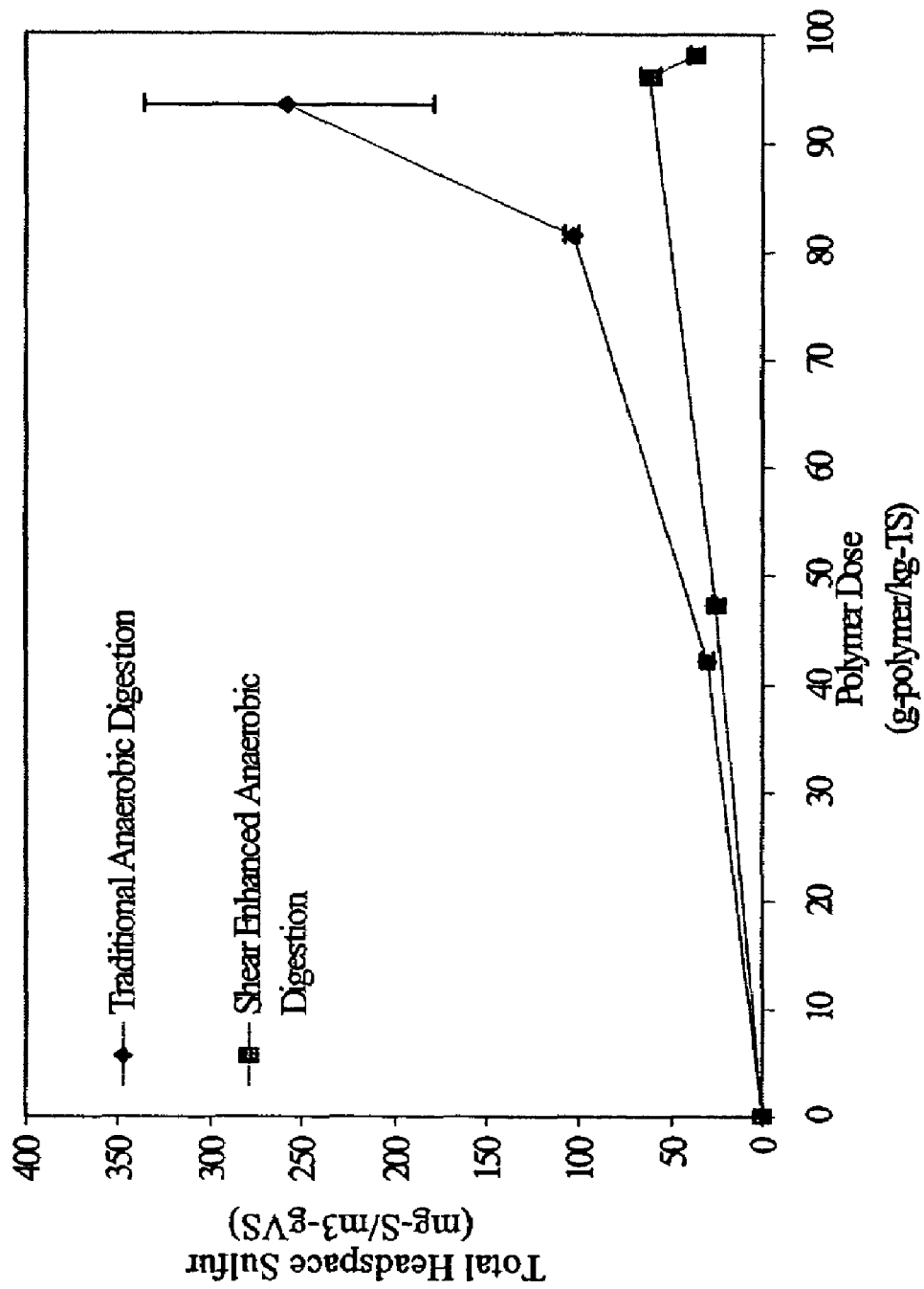
FIG. 2 is a graph representing the relationship between measured total headspace sulfur as a function of polymer dose for non-shear-enhanced and shear-enhanced anaerobic digestion.

The present invention also provides methods for reducing nuisance odors typically associated with dewatered biosolids that can be generated by residual biological activity (RBA). Such residual biological activity typically includes further degradation of any present biodegradable material beyond that occurring with the solids retention time during the digestion process. Such odors are typically associated with organic sulfur species and typically results from the degradation of proteinatious material in the sludge. It is believed that reducing the amount of volatile solids should reduce the amount of proteinatious material and should reduce the odor potential. It is also believed that the degree of residual odor minimization can be affected by the quantity and quality of delivered energy. For example, dewatering of solids from anaerobic digester 12 can be performed in dewatering system 24. The dewatering system can comprise any suitable system or apparatus that can collect, concentrate and dewater sludge. Examples include thickening systems, flotation systems, centrifugation systems, -filtration systems, such as pressure filtration, vacuum filtration, belt/press filtration and/or sand bed filtration, or combinations thereof. As mentioned, such processes can generate objectionable odor as a consequence of residual biological activity. Thus, in accordance with one or more embodiments, the present invention can provide a wastewater treatment that can characterize the odor or, in some cases, the odor potential of sludge. The sludge from the dewatering system can be analyzed to determine an odor potential associated with particular processing conditions. For example, sludge can be treated with a polymer to promote dewatering operations. For various polymer treatment dosages, a headspace sulfur can be analytically characterized utilizing, for example, a gas chromatograph and/or mass spectrograph. The concentration of particular or a selected aggregate of sulfur-containing species can then be correlated to quantify an odor potential. For example, FIG. 2 is a graph of the headspace sulfur measured as a function of polymer dose for a wastewater treated in a traditional anaerobic digestion process and in a shear enhanced anaerobic digestion process. In particular, FIG. 2 shows that the measured total headspace sulfur was significantly reduced by shear enhanced anaerobic digestion compared to the traditional, non-shear enhanced anaerobic digestion process. It is noted that particular sulfur-containing species can be selected to represent quantifiable measures of the odor potential.

In still other embodiments, the present invention can provide control of the directed energy applied to the circulating stream. In embodiments wherein the amount of energy, which can be represented in duration, intensity, periodicity or combinations thereof, can be controlled based on the measured odor potential or, in some cases, on the amount or concentration of sulfur species or sulfur-containing species. Likewise, the amount of polymer treatment dose or type of polymer utilized can be controlled in similar fashion. For example, the measured odor potential can represent a measured variable in a control loop that would be compared to a set-point to generate a control variable that can affect the control of the applied directed energy as any one of applied intensity, frequency, duration, temperature, circulation rate, settling time, digestion time, polymer treatment dosage, and/or polymer treatment type or combinations thereof. Those skilled in the art would recognize that the directed energy and/or polymer treatment control systems can incorporate controllers, algorithms and routines directed to optimize control.

Further processing of dewatered sludge can include incineration, deposition in landfills as well as land spreading.

Typically, digester enhancement technologies have focused on pre-processing of the influent to the digester. The present invention is directed to applying digester enhancement techniques in an internal recycle line so that digested biosolids can be processed and returned to the digester, as opposed to the influent residuals.

The application of shear internally, such as by recycling, as opposed to preprocessing has several advantages. The biosolids exposed to the directed energy devices of the present invention typically would have undergone maximum or near maximum reduction in volatile solids. Therefore the biodegradable material that is processed by the exposure to directed energy would be material that would not be readily degraded in the digester. The released and subsequently degraded material should promote volatile solid decomposition and decrease the total residual biological activity associated with the effluent biosolids. In addition, it is believed that directed energy applied on a return side of a heat exchanger, for example, can take advantage of weaker floc structures typically associated with increased temperatures. Moreover, applying directed energy according to the present invention in a stream that is under anaerobic conditions is believed to be advantageous because iron typically exists in the reduced state under such conditions, which can make the flocs weaker and amenable to directed energy application according to the present invention.

As used herein, the phrase anaerobic digestion refers to the biological degradation of organic substances in the absence of free oxygen. Anaerobic digestion can include conventional, mesophilic anaerobic digestion processes as well as advanced anaerobic digestion techniques.

The function and advantage of these and other embodiments of the present invention will be more fully understood from the examples below. The following examples are intended to illustrate the benefits of the present invention, but do not exemplify the full scope of the invention.

EXAMPLES

The devices utilized herein were provided by KADY Biolysis Inc., Scarborough, Me. The KADY Model-L laboratory scale mill is a bench scale rotor-stator shearing device. It was equipped with a rotor stator, produced an estimated mean velocity gradient of about 11,000 $s^{-1}$, and used a water jacket to control temperature.

The KADY Biolysis System™ (KADY® BLS™), which was used in full-scale demonstration, utilized stacked rotor stators similar to those used in the Model-L laboratory scale mill from KADY Biolysis Inc. The rotor stators were housed in a stainless steel flow through vessel. Basket screens and a macerator were used to protect the shearing heads.

All samples collected with greater than 20 minute of travel time were kept on ice for the duration of travel. Once samples arrived they were immediately store at about 4° C. until analysis. All analysis and sample characterization commenced within 24 hours of sample collection. Further storage of samples only occurred using accepted preservation techniques.

Size distributions of samples were generated by filtration through filters of various nominal pore sizes. The initial sample was centrifuged at 8,000 rpm for 15 minutes in a Model HS-J2 Centrifuge equipped with a JA-10 rotor from Beckman Coulter Inc., Fullerton, Calif. The upper limit of the colloidal size fraction was found to be about 1.5 μm, which was material that passed through Model 934-AH glass fiber filters available from Whatman PLC, Kent, Me. The other two size fractions in the colloidal size range were found to be about 0.45 μm and 0.2 μm, which were passed through nitrocellulose membrane filters from Fisher Scientific, Pittsburgh, Pa. The sub-colloidal range was material that passed through a 0.2 μm filter and a 1 kiloDalton ultrafilter from Amicon, YM-1, Millipore, Billerica, Mass.

Chemical Oxygen Demand, total solids, volatile solids and total and fecal coliforms (MPN) were all measured according to standard APHA techniques.

Solution cations, sodium, potassium, magnesium, calcium and ammonia-N were all measured by ion chromatography after filtration through 0.45 μm filters. Ion chromatography was performed on a Model DX-120 chromatograph from Dionex Corporation, Sunnyvale, Calif., equipped with an AS-40 autosampler and a CS-12 type column. Twenty-millimolar methane sulfonic acid was utilized as the eluent at a flow rate of 1 mL/min.

Volatile fatty acids were measured by gas chromatography with flame ionization detection. A ¼" (I.D.)×6' copper column was packed with 60/80 CARBOPACK® C/0.3% CARBOWAX® 20M/0.1% $H_3PO_4$ available from Supelco, Bellefonte, Pa. and installed on a Model GC-14 A/B gas chromatograph from Shimadzu Corporation, Kyoto, Japan, equipped with a flame ionization detector (FID), a AOC-20i autosampler, and a CHROMATOPAC CR-501 integrator, also from Shimadzu Corporation, Kyoto, Japan. All samples were filtered through 0.45 μm nitrocellulose filters and had phosphoric acid added to make a 1% v/v solution. Acetic acid, propionic acid, butyric acid and n-valeric acid levels were also monitored.

Digester methane and carbon dioxide was analyzed from samples taken in 1-L TEDLAR® polyvinyl fluoride bags from SKC Inc., Pennsylvania and Environmental Express, Mt. Pleasant, S.C. A 200 μL of sample was injected on a Model GC-14 A gas chromatograph from Shimadzu Corporation, Kyoto, Japan, equipped with a thermal conductivity detector (TCD) operating at a voltage of 150 mV. Chromatograms were generated and integrated by a CHROMATOPAC CR-501 integrator also from Shimadzu Corporation, Kyoto, Japan. Analytes were separated on a ¼" (I.D.)×6' column packed with HaySep D polyvinyl fluoride packing from Supelco, St. Louis, Mo.

Polymer demand was determined by capillary suction time (CST) using a Triton-WRC Type 165 CST apparatus and a Type P304M CST meter from Triton Electronics, Essex, UK with Whatman 17CHR chromatography paper from Whatman PLC, Kent, Me. The optimum dose was determined to be the polymer dose that produced the minimum CST response.

Example 1

Bench Scale Batch Studies of Enhanced Anaerobic Digestion

The potential for applied shear energy to increase gas production and volatile solids destruction was studied by applying the directed energy to enhance anaerobic digestion though a recycle stream. Anaerobically digested biosolids were obtained from Pepper's Ferry Regional Wastewater Treatment Facility (PF-RWTF), Radford, Va. from their mesophilic digester operating at a solids retention time (SRT) between 30 and 40 days. The PF-RWTF typically received a combination of domestic and industrial wastewater.

Figure 3:
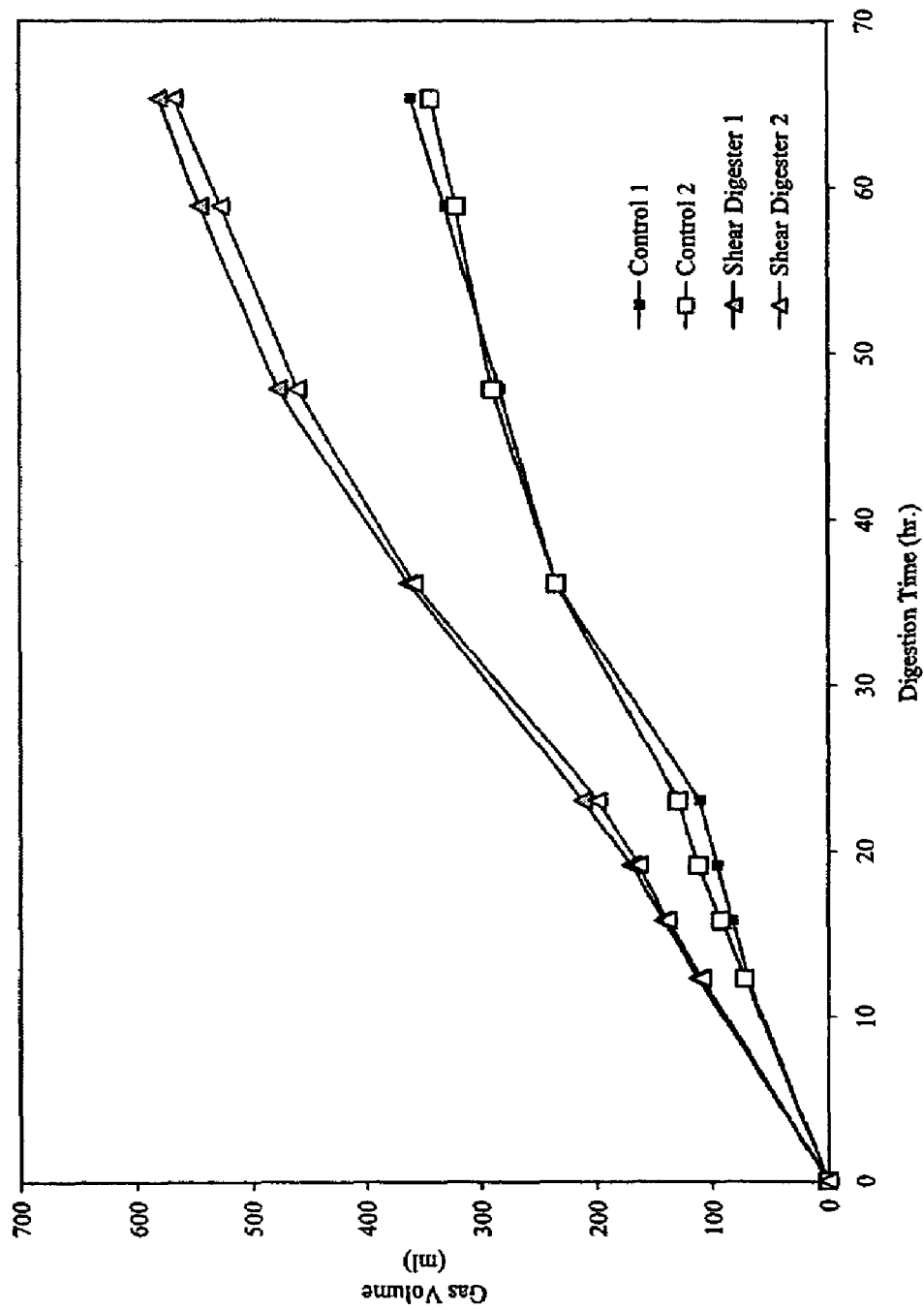
FIG. 3 is a graph showing the effect of mechanical shear energy in accordance with one or more embodiments of the present invention on biogas production from several mesophilic anaerobic digesters.

One-liter control and experimental digesters were operated under mesophilic conditions. The experimental digester had about one-third of the total volume mechanically sheared. The total gas production was monitored over a 56-hour period after allowing about 4.8 hours for entrained gas to be released from the digester. The digesters receiving mechanically sheared sludge produced about 601 and 587 ml of biogas for a 56-hour period while the control produced about 411 and 401 ml of biogas. The results presented in FIG. 3 show a marked increase in gas production, about 46%, over the relatively short study period.

The demonstrated increased production of biogas from the batch results suggests that directed energy in a recycle stream can improve mesophilic anaerobic digestion. The degree to which digestion may be enhanced was investigated by comparing a control to two different shear enhanced batch mesophilic digesters. The experimental digesters were exposed to variable shear frequency. In one experimental digester, called the Single Shear Digester, sludge was mechanically sheared once for a period of about four minutes at the onset of the experimental period then batch digested. In a second experimental digester, sludge was mechanically sheared in the same manner as the Single Shear Digester at the onset of the experiment then had about one-third of its total volume removed and mechanically sheared periodically over a 20-day period. Total solids, volatile solids and biogas production were measured over the 20-day study period to determine the effect multiple shear events have on digester performance.

Figure 4:
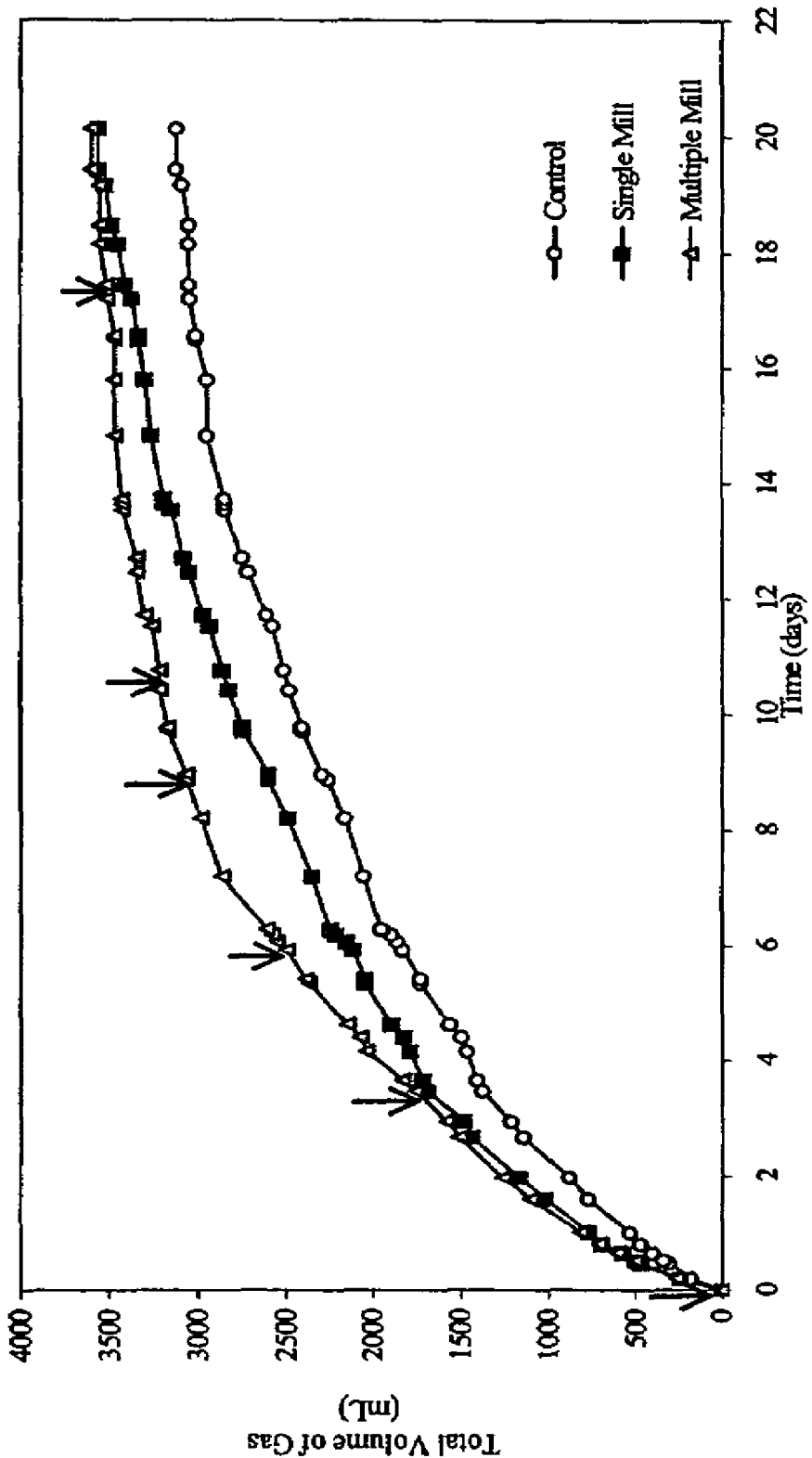
FIG. 4 is a graph showing cumulative gas production from samples from bench scale mesophilic anaerobic digesters exposed to varying mechanical shear energy events in accordance with one or more embodiments of the present invention.

FIG. 4 shows the cumulative gas production from the 3-L test digesters. The Control produced a maximum gas volume of about 3.2 L while the Single Shear Digester and Multiple Shear Digester produced about 3.66 L and about 3.60 L, respectively, which translated to an average increase of about 15% in total gas over the 20-day period.

Figure 5:
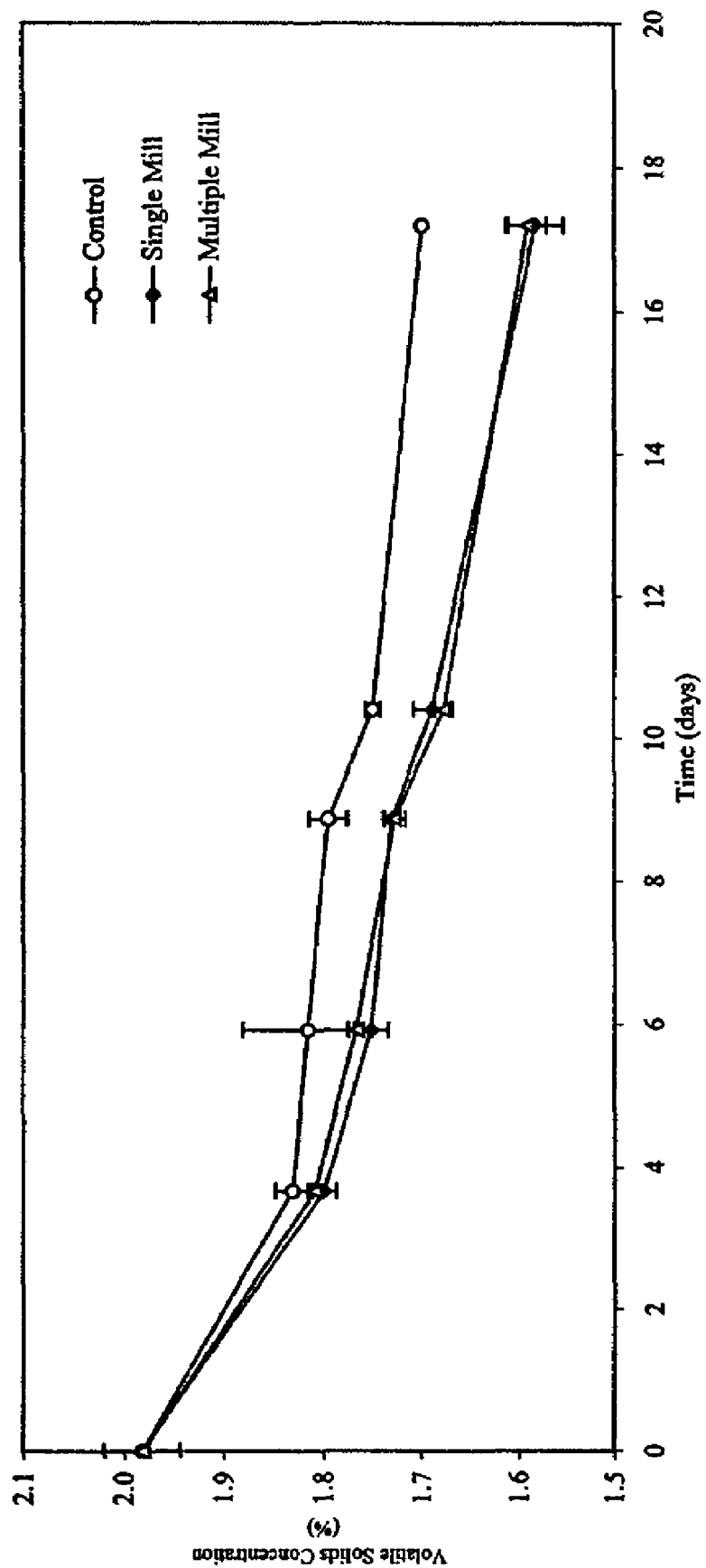
FIG. 5 is a graph showing volatile solids content from several bench scale mesophilic anaerobic digesters exposed to several of mechanical shear energy events in accordance with one or more embodiments of the present invention.

The volatile solids content of each of the digesters was measured over the 20-day study period, at each of the shear events. By the ninth day of the study there was a significant difference in the volatile solids content between the Control digester, the Single Shear Digester and Multiple Shear Digester as shown in FIG. 5. The error bars represented one standard deviation which were used to determine whether changes in solids reduction were significant.

The results presented in FIGS. 3, 4 and 5 suggest that the techniques according to the present invention can be effective in increasing volatile solids destruction and increasing biogas production.

Example 2

The Effects of Applied Shear Energy on Different Residuals

The applicability of the techniques of the present invention to different sludge sources was also evaluated. Samples were taken from four additional wastewater treatment plants that utilized completely mixed mesophilic anaerobic digestion. Control and Experimental batch laboratory digesters were setup in duplicate with the only difference being that one-third of the total volume of the experimental digesters were sheared for four minutes prior to digestion. As with the first set of tests in the previous example, all residuals were taken from the mesophilic digesters, referred to as "digested sludges." The digesters were incubated at about 33.5° C. for a period of about seven days and the total gas production was measured along with total and volatile solids concentrations.

Figure 7:
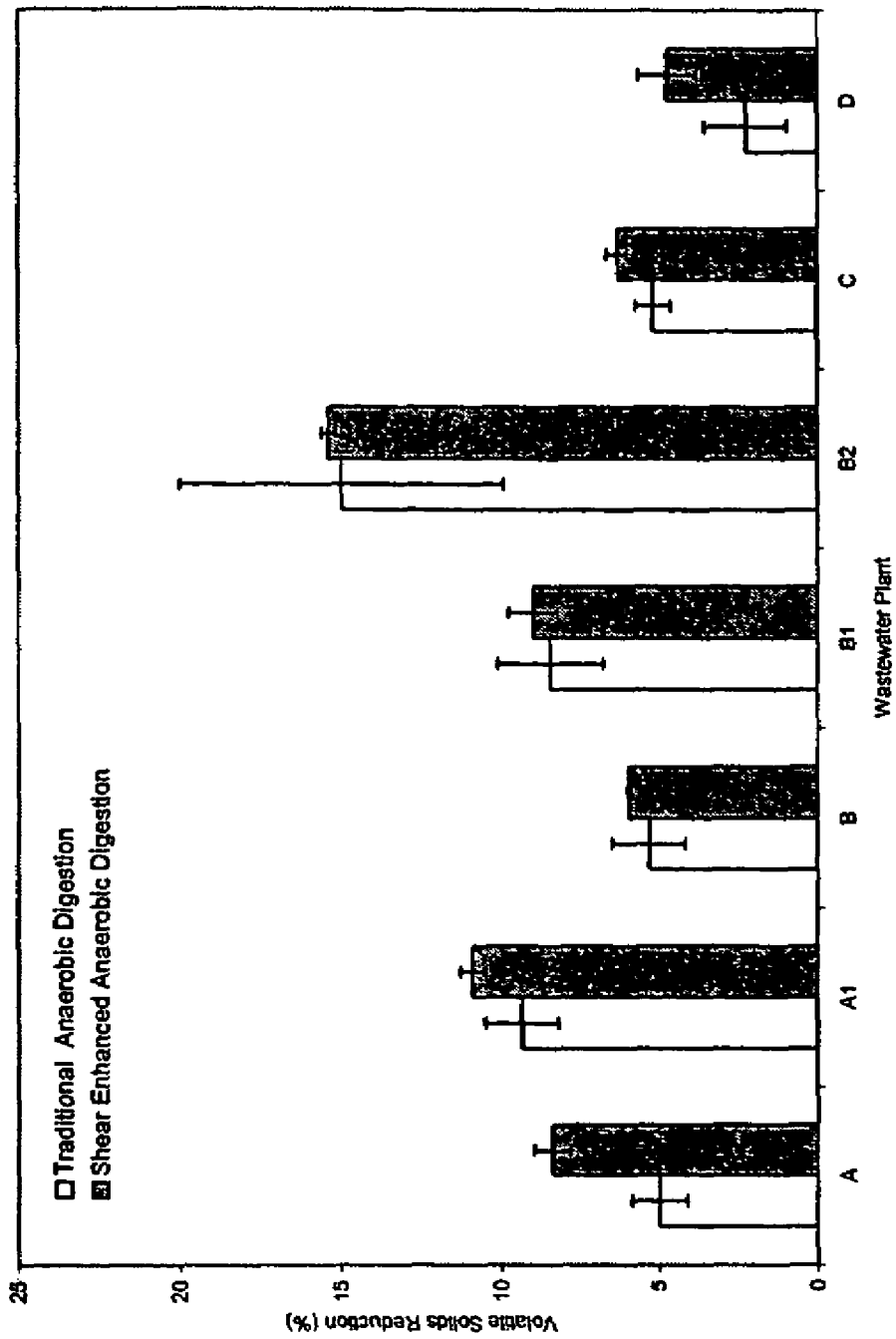
FIG. 7 is a graph showing percent volatile solids reduction in traditional compared to mechanical shear energy enhanced batch mesophilic anaerobic digestion after seven day incubation in accordance with one or more embodiments of the present invention.

The volatile solids data produced results similar to those observed in the prior batch studies. There were significant increases in the total volatile solids reduction from processed sludge from three of the four plants evaluated, i.e., plants A, C and D, as shown in FIG. 7. The error bars in FIG. 7 represented one standard deviation which were used to determine whether changes in solids reduction were significant.

The difference in observed volatile solids reduction in the Shear Enhanced Digesters beyond the corresponding Control for the 7-day study were about +1.13%, +1.56%, +2.48% to +3.48% for plants C, A1, D, and A, respectively, for the 7-day study period. When the observed differences were converted to percent increase over the Control condition, the range was determined to be about 16.6 to about 110%. It should be noted that plant D was handled slightly differently than the other facility by having about half the total volume sheared rather than the normal one-third and an eight-day incubation.

Example 3

Full-Scale Testing of Mechanical Shear Enhanced Anaerobic Digestion

The full-scale study of shear enhanced anaerobic digestion was conducted at the Gatlinburg, Tenn. (WWTP). The Gatlinburg WWTP is a 4.5 MGD plant that typically treats domestic wastewater. The anaerobic digestion system has two 58,650-cubic foot vessels that were operated in a 2-stage manner. The primary digester was a completely mixed mesophilic digester that would receive a blend of waste activated sludge and primary sludge. The secondary digester was used for settling and thickening and was unheated. The supernatant from the secondary digester was returned to the head of the plant and the solids were dewatered by centrifugation.

Figure 6:
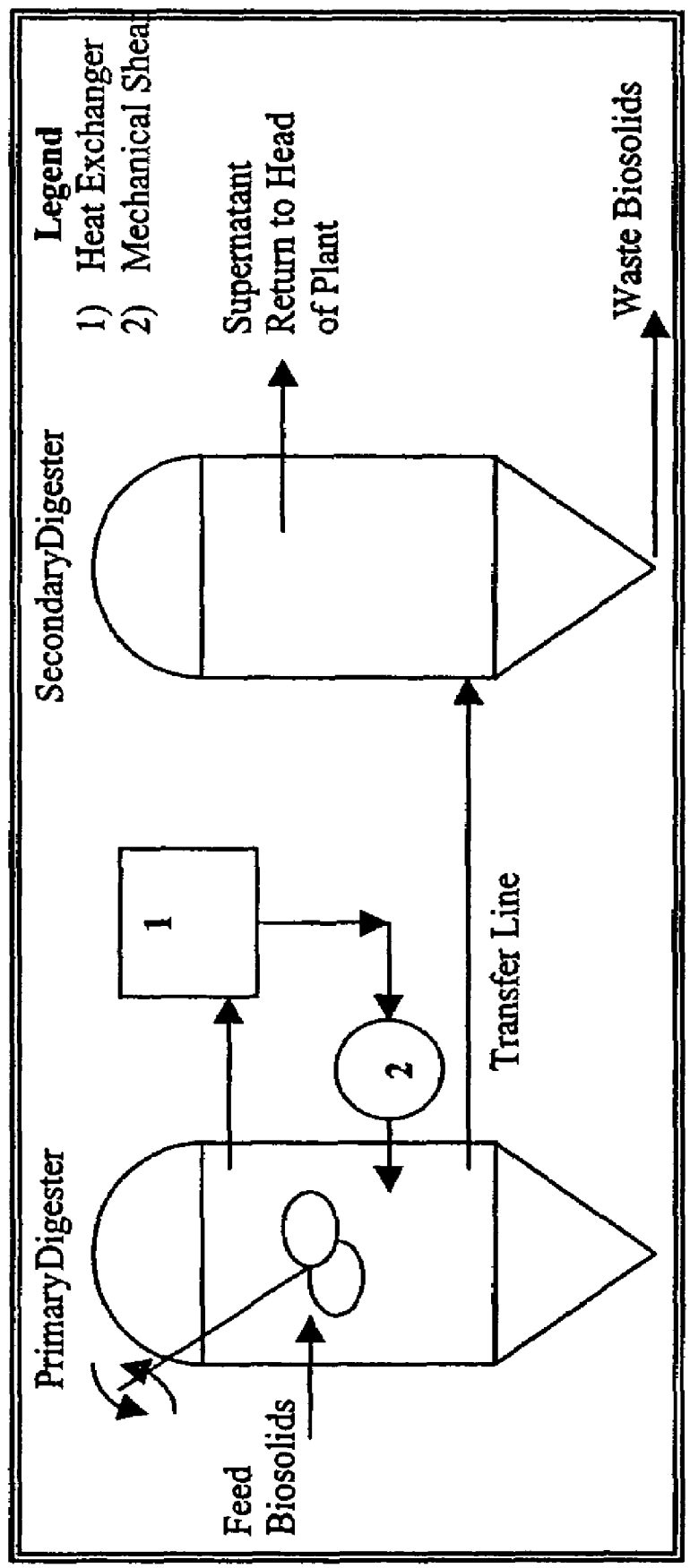
FIG. 6 is a schematic of a treatment process in accordance with one or more embodiments of the present invention comprising applied mechanical shear energy.

Total and volatile solids content, gas production and composition, total and fecal coliforms, volatile fatty acids, polymer demand in the primary and secondary digesters and particle size distributions were all measured biweekly during the background data collection phase and weekly during the shear digestion phase. Installation of the shear device according to the present invention in the digestion system followed the schematic diagram shown in FIG. 6. In particular, FIG. 6 shows a primary digester and a secondary digester fluidly connected to each other receiving feed biosolids. The primary digester has a recycle stream having a heat exchanger and a mechanical shear device in accordance with one or more embodiments of the present invention.

The following sections summarize the results in terms of biogas production, total and volatile solids destruction, colloidal production and hydrolysis, the total and fecal coliform results, digestion health as indicated by volatile fatty acids concentration and finally dewatering of the treated biosolids.

Biogas Production—Methane and Carbon Dioxide

Figure 8:
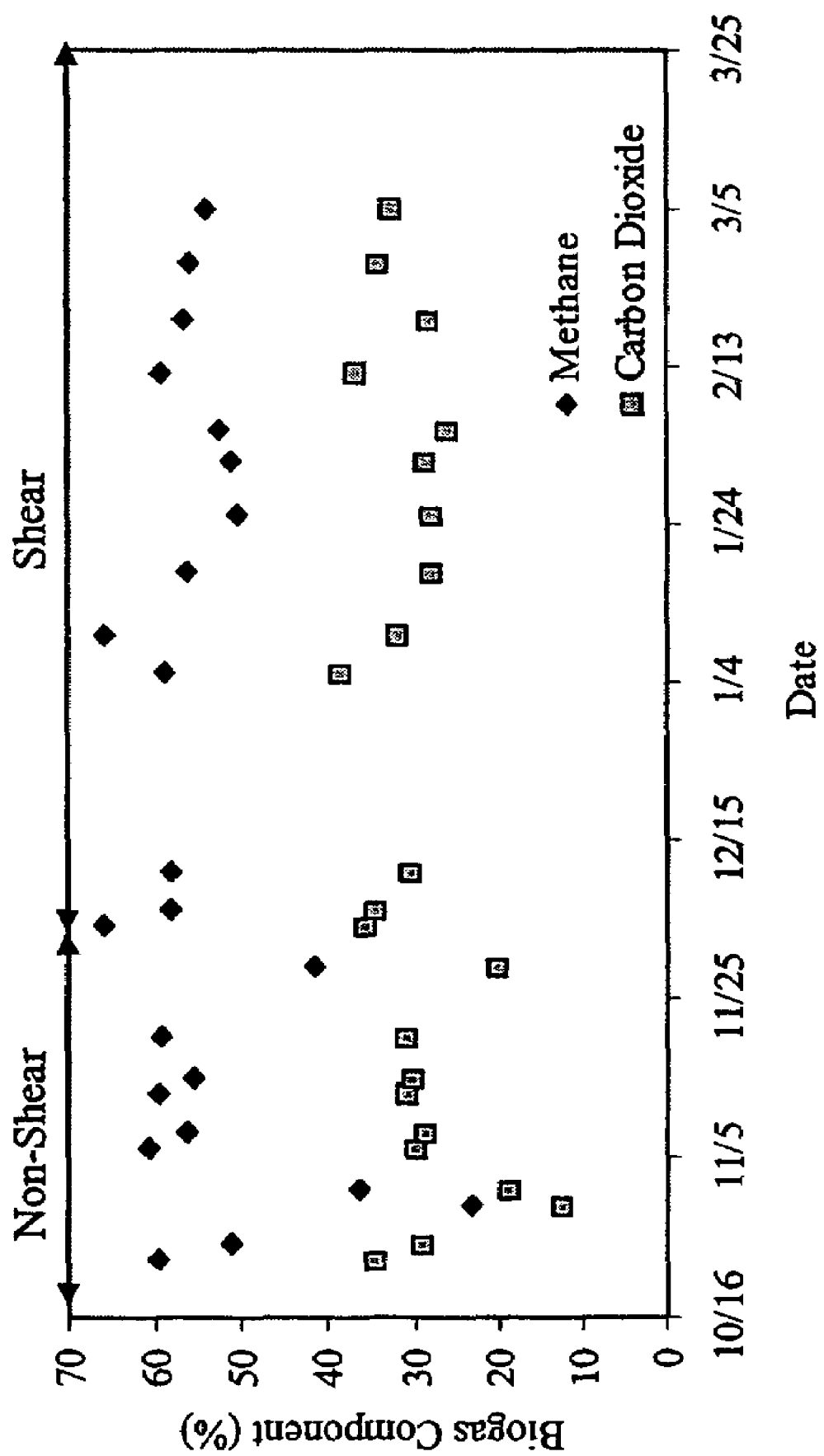
FIG. 8 is a graph showing the percentage of methane and carbon dioxide in headspace of several samples from a mesophilic digester, with and without applied mechanical shear energy in accordance with one or more embodiments of the present invention.

As with the batch studies, volatile solids reduction and gas production were the two main parameters of changes in digester performance. Gas production was measured concurrent with the fraction methane and carbon dioxide. The percentage of carbon dioxide and methane were monitored in the primary digester headspace as a means to monitor digester health. Prior to the operation of the shear energy device the mean percent carbon dioxide was typically above about 29% and the percent methane was typically about 56%. During the operation of the shear energy device, the mean methane and carbon dioxide as percent head space were about 57% and about 32% respectively, as shown in FIG. 8 indicating little change in composition.

Total and Volatile Solids Concentrations

Figure 9:
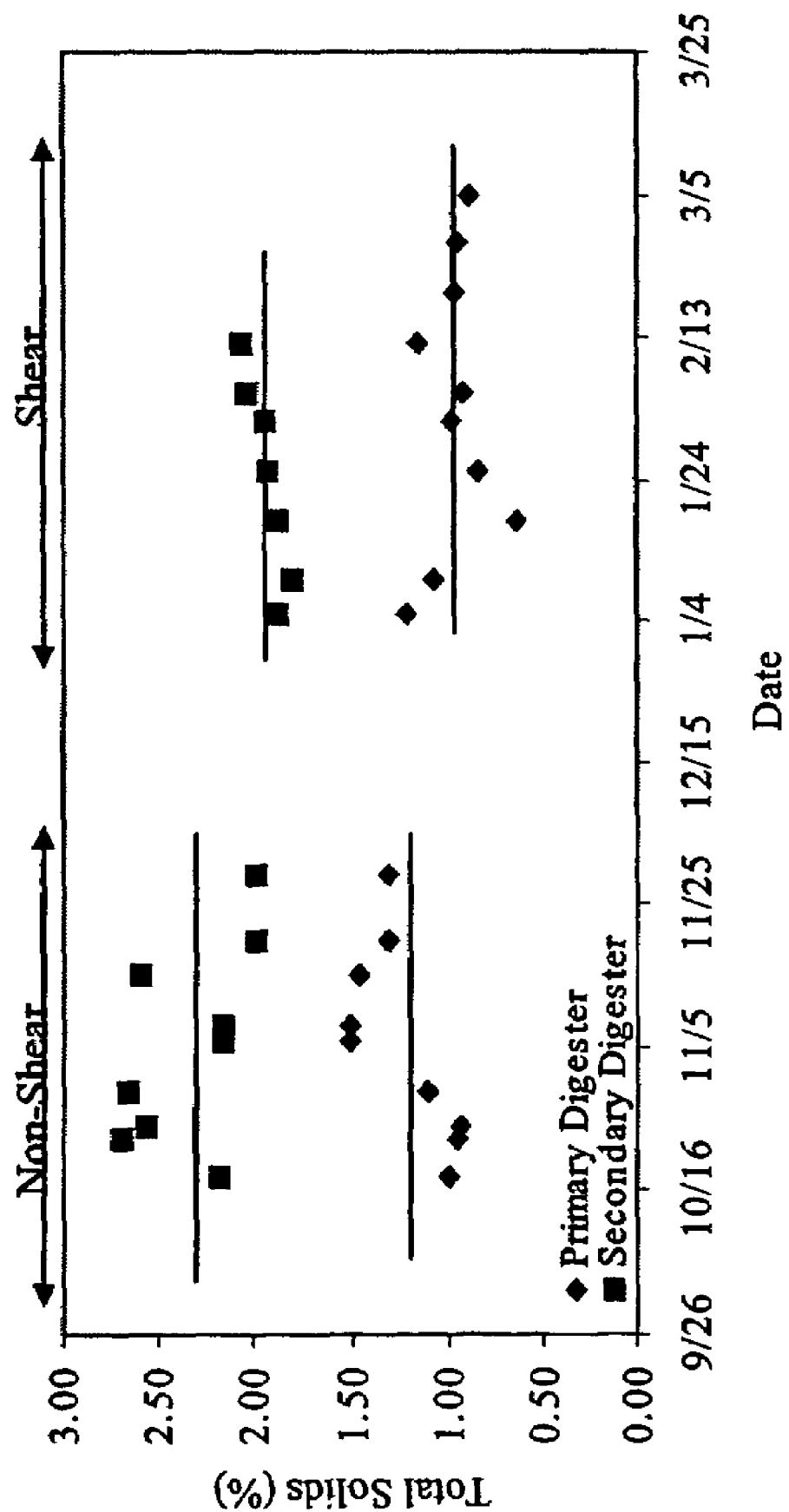
FIG. 9 is a graph showing total solids concentration in primary and secondary digesters under different applied directed energy conditions in accordance with one or more embodiments of the present invention.
Figure 10:
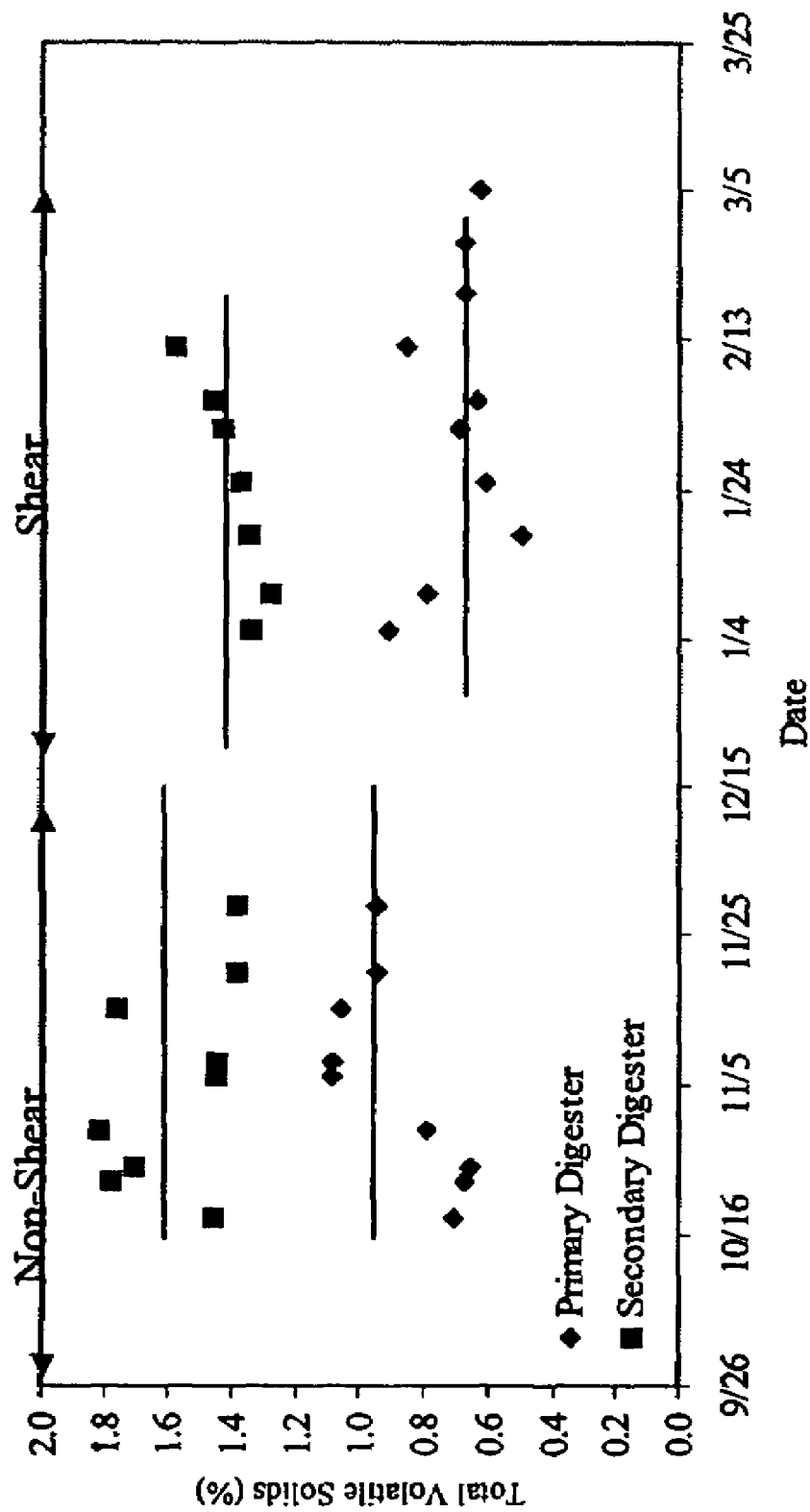
FIG. 10 is a graph showing volatile solids concentration in primary and secondary digesters with and without applied mechanical shear energy in accordance with one or more embodiments of the present invention.

As with the batch studies both total and volatile solids concentrations were monitored in both the primary and secondary digesters. There was an apparent decrease in both total and volatile solids after the initiation of the shear process. Prior to applying shear energy, the average total solids content in the primary and secondary digesters was typically about 1.23% and about 2.33% respectively. After one solids retention time of the shear energy device operation, the average total solids content in the primary digester was found to be about 0.96% and about 1.93% in the secondary digester. The data showed about a 22% reduction in total solids in the primary digester and about a 17.2% reduction in the secondary digester. The volatile solids content for the primary and secondary digesters prior to shearing according to the present invention was typically about 0.89% and 1.57%. After introducing shear energy, it was found to be about 0.70% and 1.40%, which correspond to reductions of about 21% in the primary digester and about 11.1% in the secondary digester. These data are shown in FIGS. 9 and 10.

Colloid Production and Hydrolysis

Hydrolysis of colloidal material followed by biological degradation is typically one of the mechanisms for the reduction of volatile solids during anaerobic digestion. Utilizing high shear energy can be effective for the enhancement of anaerobic digestion. Directed shear energy can render material biodegradable and within the typical colloid size range (less than about 1.5 μm). To determine if the shear energy device of the present invention would be capable of generating materials in the colloid size range that are biodegradable the chemical oxygen demand (COD) of different particle size fractions was measured. The size fractions of particular concern were those between about 1.5 μm and 0.2 μm, which are characterized as colloidal, and material between 0.2 gm and 1 kiloDalton, characterized as sub-colloidal. All colloidal data was reported as g-COD/g-VS. This normalization was done to negate any effect that fluctuating solids content within individual samples would have on the colloid levels.

Figure 11:
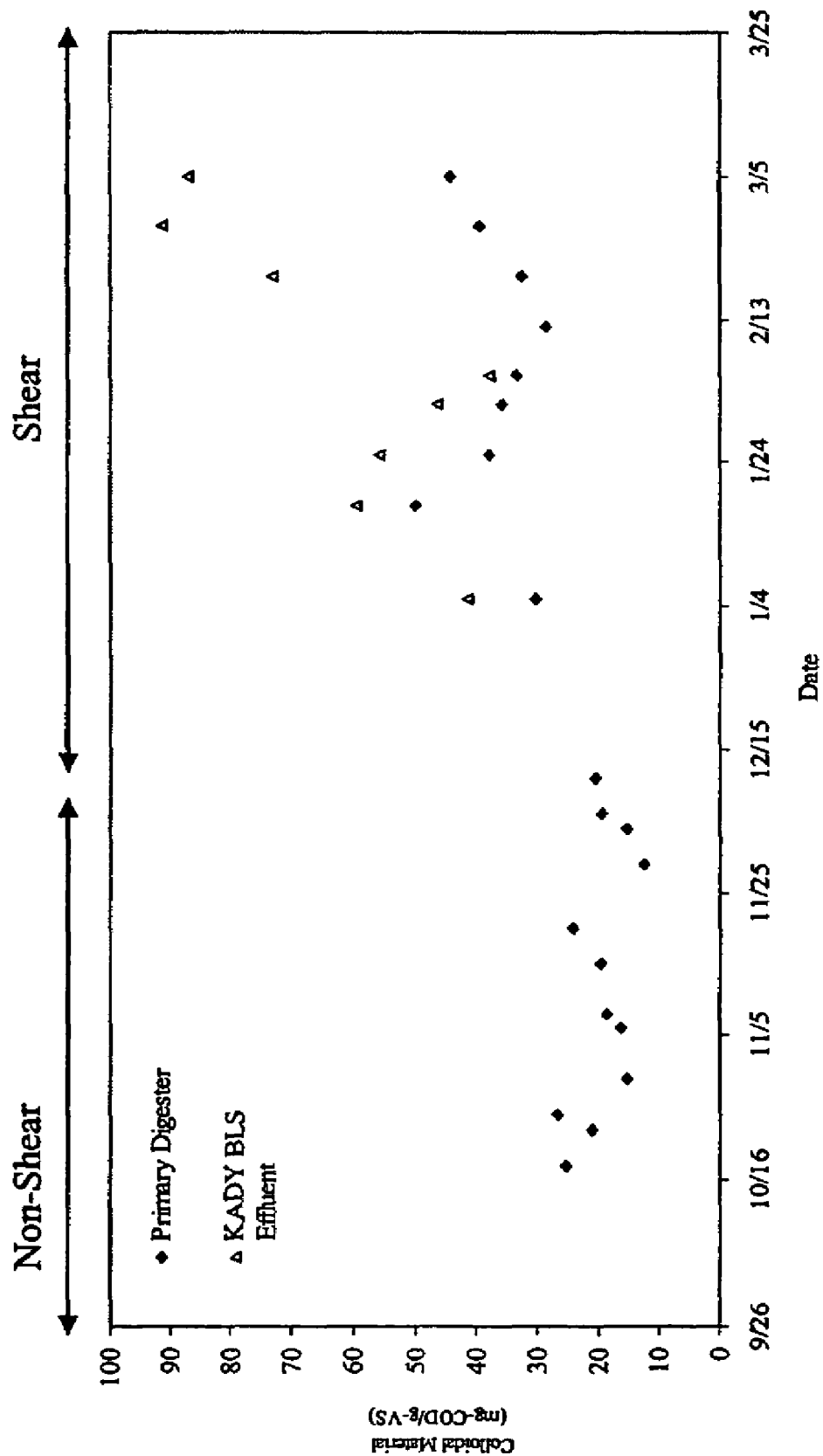
FIG. 11 is a graph showing colloidal COD content of mechanically sheared effluent in accordance with one or more embodiments of the present invention.

FIG. 11 shows the concentration of colloidal COD per gram volatile solids over the course of the study period. What is apparent in FIG. 11 is that after one SRT of shear operation, the colloid load in the primary digester increased by a factor of about three over the unsheared operation. This suggests that the shear device is capable of producing material in the colloidal size range even with short mill retention times.

To determine if the material that is generated by the shear device is bioavailable, the removal of colloids between the primary and secondary digester, the generation of subcolloidal material in the primary digester and the ammonia-N content of the digester were monitored. The average removal of colloidal material between the primary digester and the secondary digester prior the addition of the shear energy device was about 10.9 mg-COD/g-VS. After the installation of the mill colloidal removal increased to about 28.3 mg-COD/g-VS, for a mean increase of about 161% over the non-sheared condition.

Concurrent with the observed increased removal of colloidal material was an increase in the generation of sub-colloidal COD, less than about 0.2 gm to 1 kiloDalton. The levels of sub-colloidal COD increased from a mean of about 4.8 mg-COD/g-VS prior to the shear operation to about 7.2 mg-COD/g-VS during operation in the primary digester and about 2.0 mg-COD/g-VS to about 3.5 mg-COD/g-VS for the secondary digester.

The ammonia-N content in both the primary and secondary digesters increased per unit of volatile solids after the addition of the shear device. The mean ammonia-N content in the primary digester increased from about 25.3 mg-NH4-N/g-VS to about 45.5 mg-NH4-N/g-VS. In the secondary digester the mean concentration changed from about 12.0 mg-N114-N/g-VS to about 25.4 mg-NH4-N/g-VS over the same time period. The mean soluble ammonia-N measured in the sheared effluent was about 47.7 mg-NH4-N/g-VS suggesting that the shearing may not directly contribute to the destruction of protein or proteinatious material. Rather the mill is believed to be solubilizing protein or proteinatious material, which is then degraded biologically in the digester, which can lead to ammonia production.

Effect of High Intensity Shear on Pathogen Load (Total and Fecal Coliforms)

The expected reduction in volatile solids demonstrated in the batch studies suggested that it may be possible to reduce the overall mass of biosolids to be disposed and reduce the pathogen load associated with the waste biosolids. It is believed that directed shear energy could disperse particles, thus making indicator organisms more vulnerable to destruction. To determine if directed energy enhanced anaerobic digestion can be capable of reducing pathogens, the most probable number method for total and fecal coliforms was measured and used as a pathogen indicator.

The mean log reductions in total and fecal coliforms during the baseline period and shear energy device operation are summarized in Table 1. During the baseline monitoring period the mean reductions in total and fecal coliforms was found to be about 1.4 units and about 1.5 units, respectively. After the operation of the directed shear energy device for about one SRT the mean log reduction in total coliforms was about 1.4 units and about 1.9 units for fecal coliforms. The data suggest that there was no change in the total or fecal coliform removal efficiency of the digester with the addition of directed shear energy.

TABLE 1

Log Reductions in Fecal and Total Coliforms during Baseline Operation and Shear Device Operation.

| Coliform | Baseline Condition (Log Reduction) | Shear Energy Enhanced Digestion (Log Reduction) |
| --- | --- | --- |
| Total | 1.4 | 1.4 |
| Fecal | 1.5 | 1.9 |
| Significance | x | None |

Volatile Fatty Acids Concentrations—Digestion Health

Short chain fatty acids, acetic acid, propionic acid, butyric acid and valeric acid, are typically good indicators of the efficiency and health of the digester because when there is a build-up of short chain fatty acids in a methanogenic system, it can be indicative of a process upset.

Figure 13:
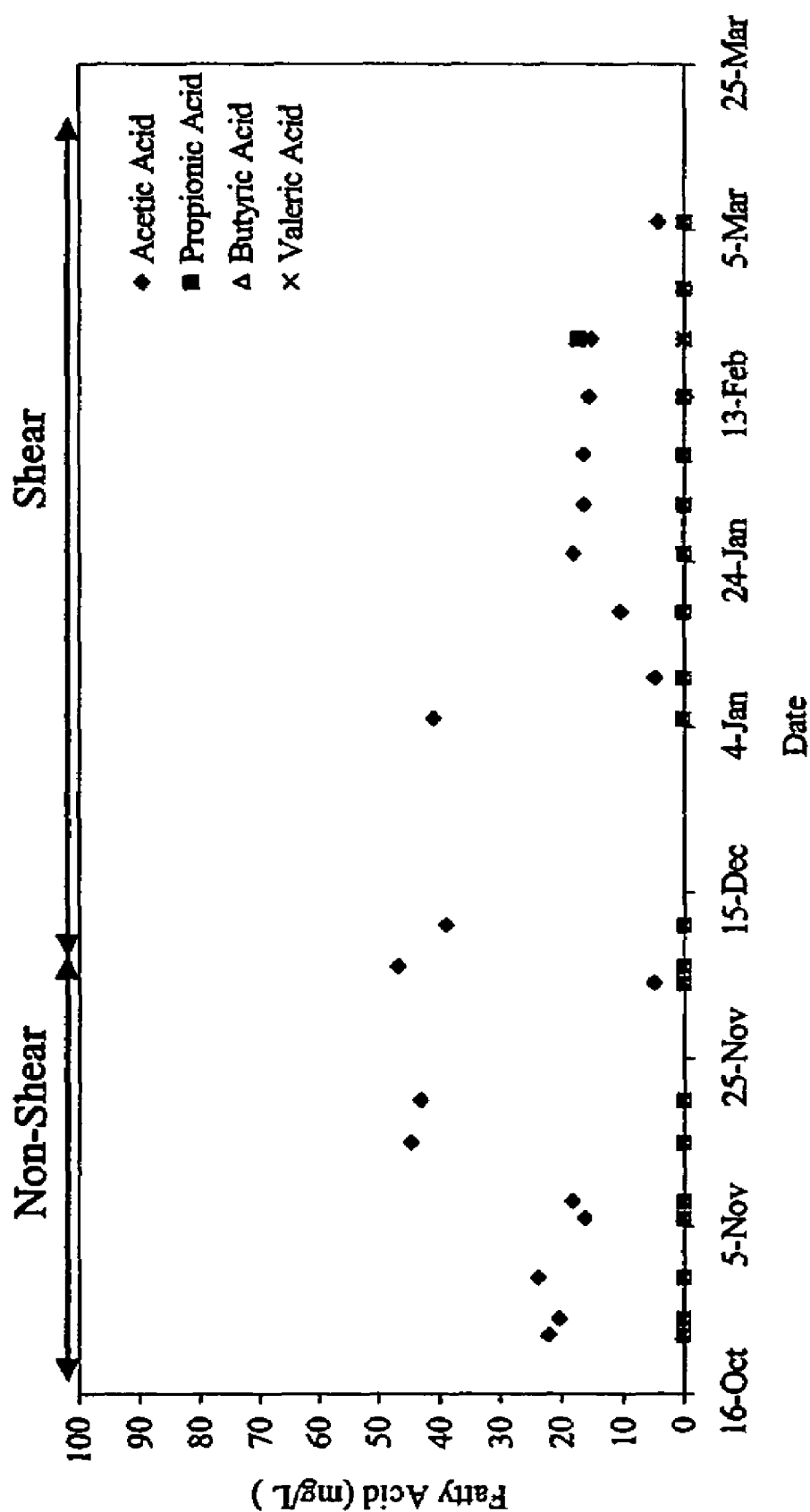
FIG. 13 is a graph showing short chain fatty acid concentration in a secondary digester in accordance with one or more embodiments of the present invention.

Samples from the influent, primary digester and secondary digester were measured for short chain volatile fatty acids by flame ionization detector gas chromatography. In general, the fatty acid measured at detectable levels was acetic acid that ranged from about 1 mg/L to about 44 mg/L in the primary digester (FIG. 10) and about 4 to about 47 mg/L, as shown in FIG. 13, in the secondary digesters. No discernable trend could be found between the samples before and after shearing was initiated.

Dewatering Considerations—Polymer Demand

A consideration for introducing the shear to the digester through an internal recycle was the increase in colloidal levels in the digesters and the impact of this might have on the subsequent conditioning and dewatering. WWTP typically dewatered biosolid material by centrifugation, therefore significant changes in polymer demand could affect operating costs.

The polymer demand can be determined, in part, by the level of colloids in solution, such that the increase that would be observed when the shear device was operated should increase the polymer demand. The polymer dose corresponds to the lowest capillary suction time for both the primary and secondary digesters during the course of the study was considered as the polymer demand. The cationic polymer used was CLARIFLOC® C3268 coagulant, available from Polydyne Inc., Riceboro, Ga.

The baseline polymer demand for the primary digester biosolids was about 5.8 g-polymer/Kg-TS. Once the mill was allowed to run for about one SRT at about 25 gpm on a continuous basis, the polymer demand increased to about 10.8 g-polymer/Kg-TS, which represented about an 84.4% increase in polymer demand.

The increase in polymer demand in the single digester data was not observed in the dual digester operation. Polymer demand decreased after the installation and operation of the mill. Prior to applying directed shear energy, the secondary digester solids had a polymer demand of about 6.0 g-polymer/Kg-TS. After the shear energy operation, polymer demand decreased to about 5.3 g-polymer/Kg-TS, about a 12.4% decrease.

Figure 14:
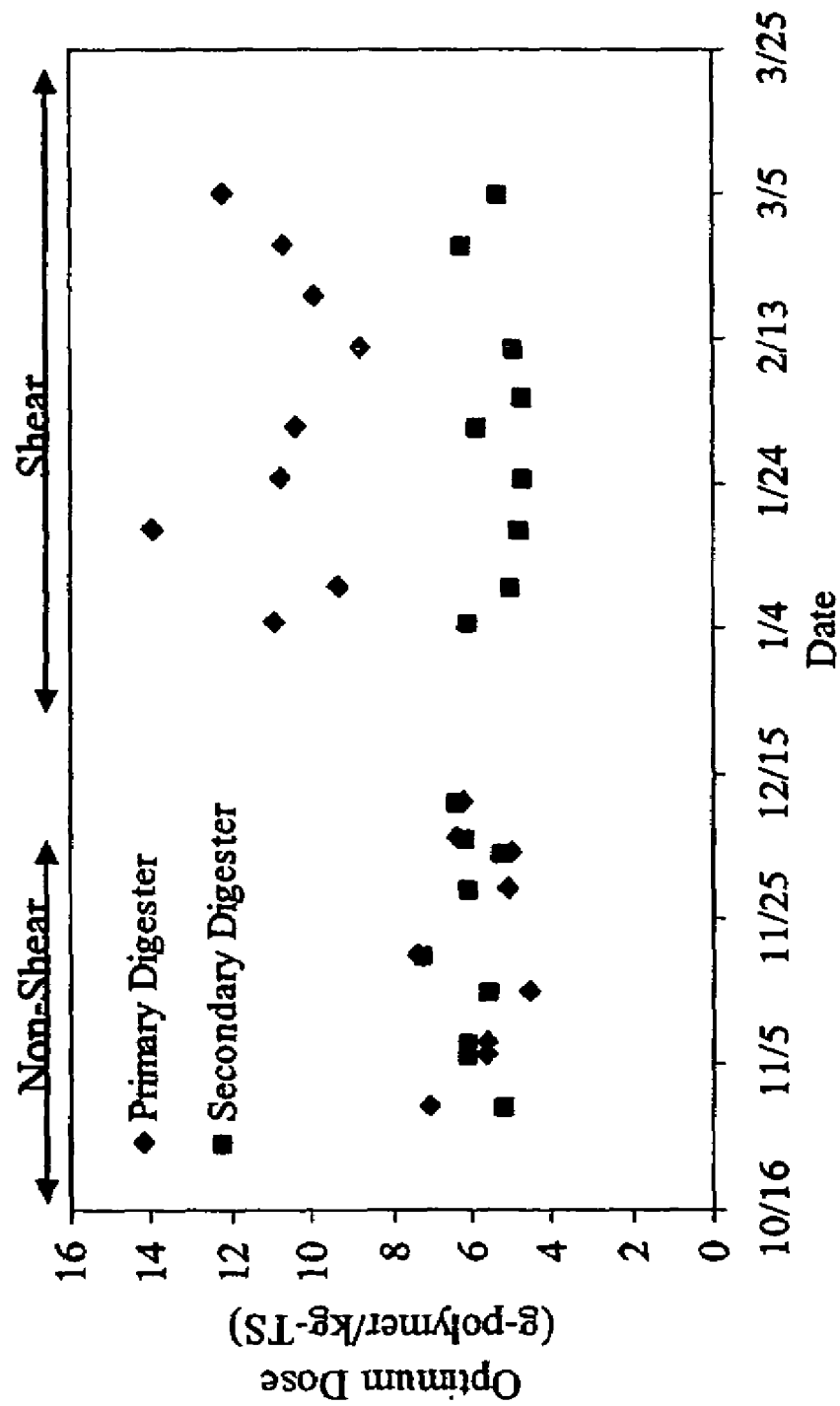
FIG. 14 is a graph showing polymer demand associated with anaerobic digestion for several samples in accordance with one or more embodiments of the present invention.

Polymer demand in each of the digesters for the duration of the experimental period is shown in FIG. 14 and illustrates that prior to shearing, there was no observed difference in polymer demand between and dual and single digester system. After introducing the shear device, the polymer demand nearly doubled in the primary digester while the dual digester system decreased slightly and remained steady.

Batch Studies

The traditional measures of digester performance, gas production and VS reduction, suggested that shearing did increase the bioavailablility of anaerobically stabilized biosolids in batch experiments. In the batch experiments where gas production was measured there was a marked increase over the control condition, about 46 (FIG. 3) and about 14.1% and 15.3% (FIG. 4).

The rate of gas production is shown in FIG. 3, wherein one digester had shear energy applied multiple times, another was sheared once and the control was allowed to digest without shear. The data exhibits an asymptotic behavior approaching a maximum total gas production. The rate at which each of the digesters reached this maximal value appears to be a function of the level of shear of the sludges. In FIG. 3, the sheared digesters produced about same amount of total biogas, about 3559 ml and about 3597 ml for the single shear digester and multiple shear digester, respectively. However, the total gas produced began to level off earlier in the multiple shear digester, day 12, compared to the single shear digester, day 19.

A similar response was observed in the corresponding volatile solids data from the batch experiments. FIG. 5 showed the volatile solids concentration within the each digester during the multiple shear experiment. Like the data shown in FIG. 3, there was a rapid change in volatile solids content concentration early and yet the periodic change decreased over time and appeared to level out.

The volatile solids data in conjunction with the gas production data suggested that the amount of material that can be released and subsequently degraded during enhanced anaerobic digestion can be limited. Furthermore, the return on energy invested appeared to decrease with each pass through the shear system.

The data shows that simply adding a shear energy device to a digester and running as much of the digester volume through the shear device as possible may be inefficient.

The data in FIG. 5 showed that three out of four surveyed wastewater treatment plant residuals that were surveyed had significant increases in volatile solids content reduction. Further understanding how particular sludge material respond to shear enhanced digestion can avoid oversizing equipment and/or process failure.

Pilot Demonstration

The batch studies demonstrated that high intensity shear can be used to enhance anaerobic digestion. The batch studies did not address the mechanisms for volatile solids content destruction, digester health and solids handling.

The full-scale demonstration exhibited a similar reduction in volatile solids during the shear enhanced digestion portion of the study as observed in the batch studies. An evaluation of the colloidal data in conjunction with ammonia-N data suggests that hydrolysis is enhanced.

Figure 15:
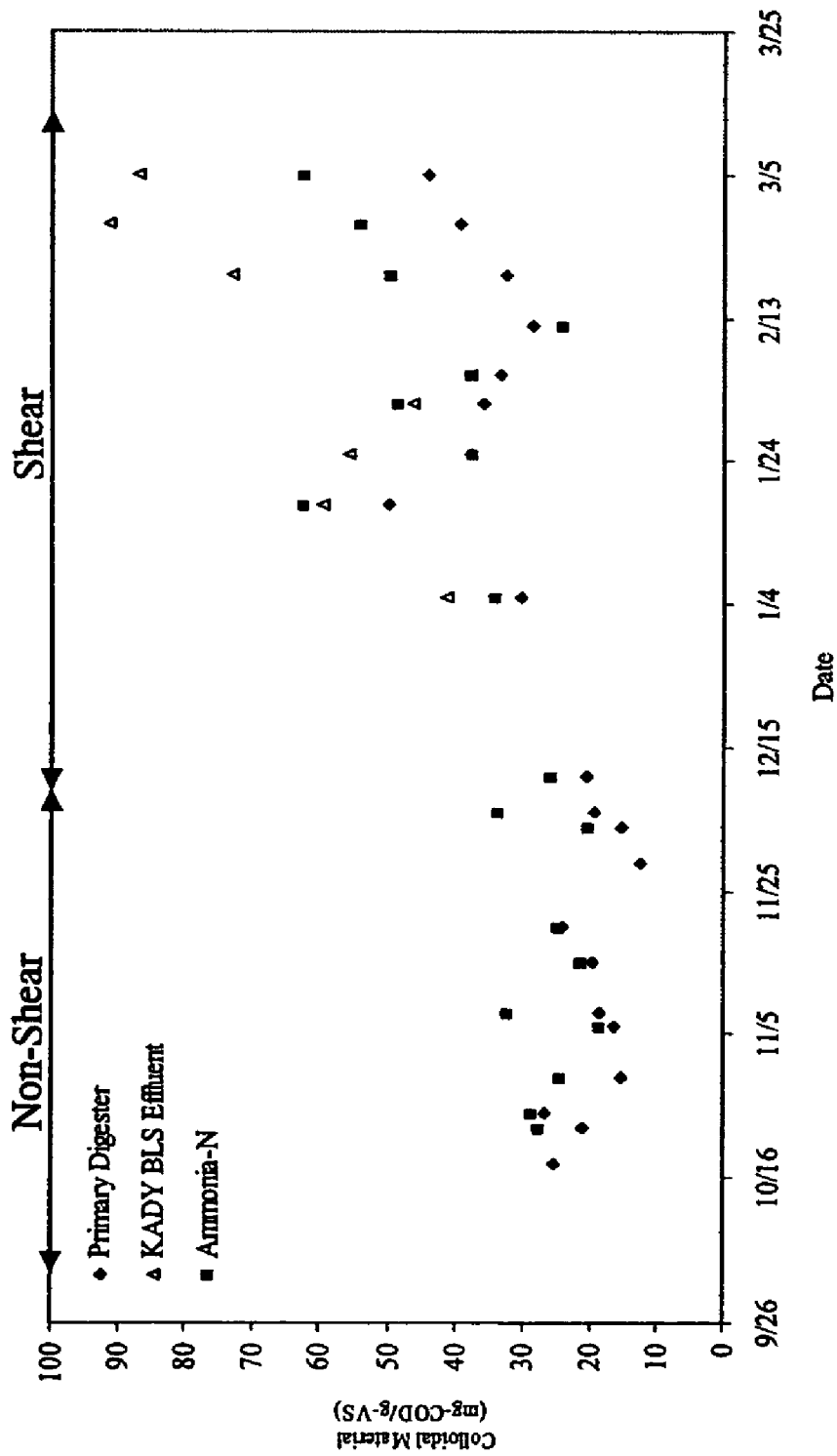
FIG. 15 is a graph showing colloid and ammonia concentrations in a primary digester with and without applied mechanical shear in accordance with one or more embodiments of the present invention.

FIG. 15 showed the colloidal COD and Ammonia-N content of the Primary Digester and the colloidal COD of the KADY® BLS™ effluent. The difference between colloid levels in the mill effluent and the Primary Digester corresponded to an increase in the soluble ammonia-N. The increase in ammonia-N suggested that there can be protein degradation during shear energy enhanced anaerobic digestion.

Figure 12:
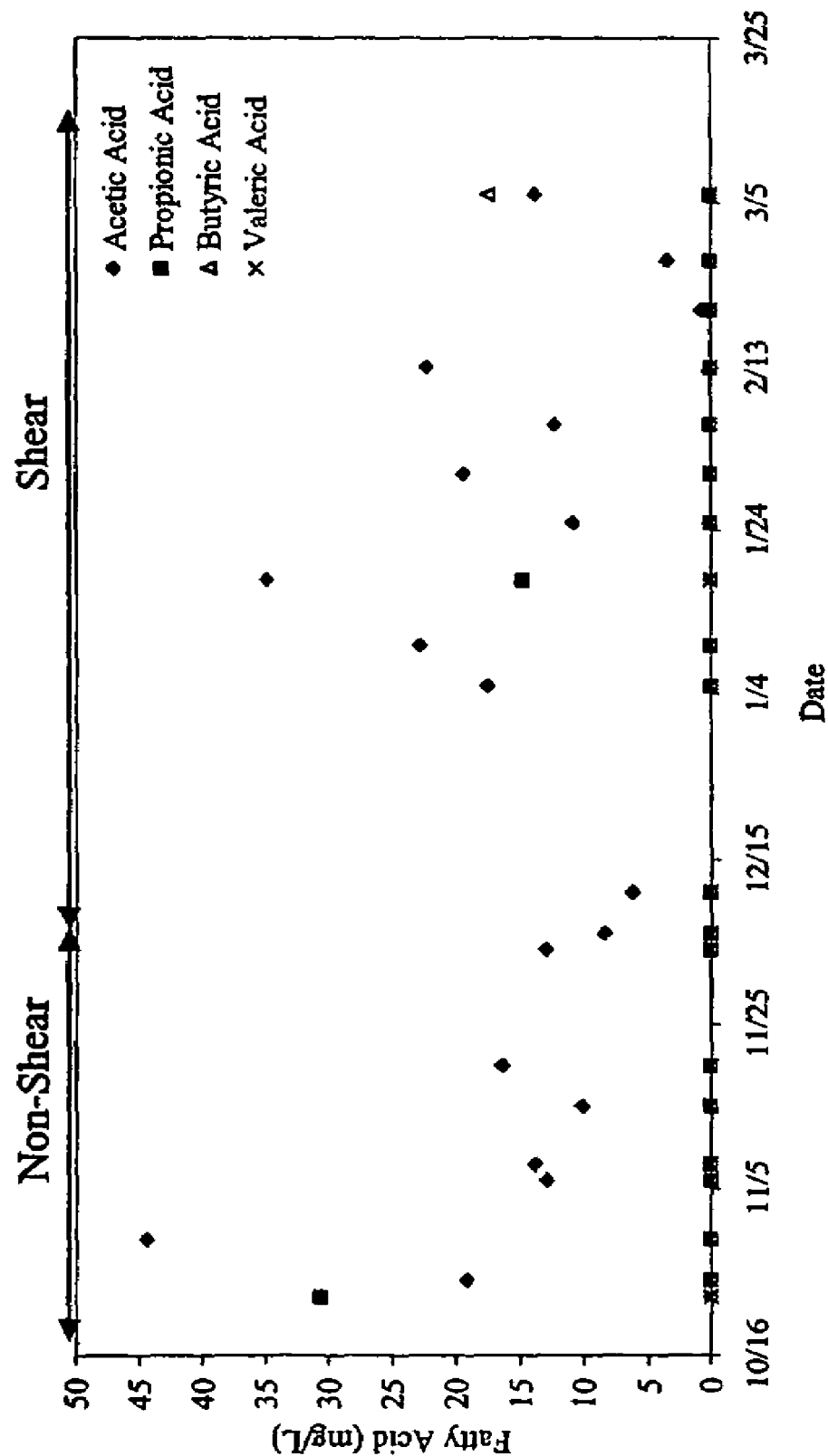
FIG. 12 is a graph showing short chain fatty acid concentration retrieved from a primary digester in accordance with one or more embodiments of the present invention.

The shear energy produced from the inventive device can be capable of generating colloidal material and thus floc disruption. The shear energy device was operated at about 25 to about 30 gpm on a continuous basis and, based on the methane to carbon dioxide ratios (FIG. 8), and the levels of short chain volatile fatty acids (FIG. 12), no process upset or disturbance was observed. What the data suggested is that the throughput rate, the number of times the sludge passes through the shear energy device within an SRT, was sufficiently low to avoid process upset while still producing increased volatile solids content destruction.

It is not known why the polymer demand in the secondary digester decreased after the observed increased in the primary digester following shear application. Some potential theories include reflocculation of free colloids and/or continued biodegradation of the colloids in the secondary digester.

The use of mechanical shear energy to generate biodegradable material from actively digesting anaerobic sludge for reinjection into the digester has been shown to enhance mesophilic anaerobic digestion. Gas production increases ranged from about 15 to about 46% while increases in volatile solids destruction ranged from about 16.6 to 110% above the control condition.

Overall process stability was also observed during the full-scale testing of shear enhanced anaerobic digestion. Both volatile fatty acids composition and the fraction of methane and carbon dioxide in the digester gas suggested that the digestion process during shear enhancement would not be destabilized at the set throughput rate.

Example 4

Centrifuge Simulation for the Production of Odors from Dewatered Sludge or Biosolids Shear produced during the centrifugation process and cake scrolling as hypothesized as the causative agents of odors from dewatered biosolids produced by centrifugation. However, short of producing bench scale models of field centrifuges there currently is not a laboratory device or procedure that adequately simulates a field centrifuge conditions. The results suggest that the addition of shear during polymer addition best simulates field conditions producing peak sulfur odors similar to those found in samples generated from high and low solids centrifuges at the same facility.

In order to produce odors levels in a laboratory experiment similar to those found in the field two conditions must be met; a high solids content cake must be produced as well as the exposure of the biosolids to high intensity shear. A laboratory centrifuge produces sludge cakes that are generally slightly lower in solids content than field centrifuges with the normalization of odor production to volatile solids content of the sample this deficiency can be over come. Unlike the field centrifuge there is virtually no shear produced in a fixed rotor laboratory centrifuge. In order to simulate the various energies that sludge is exposed to during dewatering shear must be introduced in the laboratory. The introduction of shear is accomplished by exposing the sludge to high intensity shear for a short period in a KADY® Model L laboratory mill. The mill uses a rotor-stator device to impart shear to materials in a batch vessel at an estimated mean velocity gradient (G) of about $11,000 \text{ s}^{-1}$. Below is an outline of the centrifuge simulation process.

Methodology:
1) Maintain sludge temperature at least about 30° C.
2) Determine optimum polymer dose by capillary suction time, (minimum CST corresponds to about the optimum polymer dose)
3) Combine polymer and sludge in the KADY® mill vessel, at 0.5, 1.0, and 1.5 times the optimum polymer dose.
4) Operate the KADY® T mill for 30 seconds. The 30-second period should include the time to reach full speed but should not include the time it takes for the mill to come to a stop after the power is turned off.
5) Place the polymer/sludge mixture in centrifuge vessel and centrifuge in a laboratory centrifuge at about 17,700×G for about 10 minutes.
6) Decant supernatant from samples and recap the solids in the tube to minimize moisture loss.
7) Place approximately 8 grams of dewatered biosolids in a 40-ml EPA vial and cap with TEFLON® polytetrafluoroethylene faced silicon septa. Generate three samples per sludge cake by this manner.
8) Measure the total and volatile solids content of the sludge that is placed in the EPA vials.
9) Measure the headspace content of analytes of interest after incubation at about 20° C. for a given time period. A usual sampling protocol for sulfur compounds is about 2, 4, 6 and 10 days of incubation.
10) Normalize headspace odor concentration to total Volatile solids contained in the EPA vial.

FIG. 2 shows the measured total headspace sulfur as a function of polymer dose for various samples of dewatered anaerobically digested biosolid treated and analyzed according to the procedure described above. As discussed above, the results presented in FIG. 2 shows that the total sulfur generated can be reduced by applying the techniques of the present invention.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are exemplary and that actual parameters, dimensions, materials, and configurations depend upon specific applications for which the teachings of the present invention are used. For example, the size, capacity, materials of construction of the components of the directed energy systems of the present invention can vary depending on the particular service. Thus, for example, use of stainless steel-based components may be necessary depending on the properties of the fluid to be treated. Those skilled in the art will recognize, or be able to ascertain, using no more than routine experimentation, equivalents to the specific embodiments of the invention described herein. It is, therefore, understood that the embodiments disclosed herein are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention. As used herein, all transitional phrases such as "comprising," "including," "carrying," "having," "containing," "involving," and the like are open-ended, i.e. to mean including but not limited and only the transitional phrases "consisting of and " consisting essentially of shall be closed or semi-closed transitional phrases, respectively, as set forth in § 2111.03 of the United States Patent Office Manual of Patent Examining Procedures.

We claim:
1. A method of treating wastewater and increasing the efficiency of anaerobic digestion, comprising:
   a. directing wastewater to an anaerobic digester;
   b. directing wastewater from the anaerobic digester, through a recirculation loop, and back to the anaerobic digester;
   c. applying directed energy to the wastewater as the wastewater is circulated through the recirculation loop; and
   d. measuring an odor potential of the wastewater and controlling the application of the directed energy to the wastewater as a function of the measured odor potential.
2. The method of claim 1 wherein applying directed energy to the wastewater includes applying mechanical shear energy to the wastewater passing through the recirculation loop.
3. The method of claim 2 wherein applying mechanical shear energy to the wastewater passing through the recirculation loop includes directing glass or metal beads against the wastewater.

4. The method of claim 2 wherein the wastewater includes floc and wherein applying mechanical shear energy to the wastewater includes shredding or pulverizing the floc.

5. The method of claim 1 wherein applying directed energy to the wastewater includes applying hydraulic shear energy to the wastewater passing through the recirculation loop.

6. The method of claim 5 wherein applying hydraulic shear energy to the wastewater includes varying the pressure of the wastewater in the recirculation loop.

7. The method of claim 6 including pressurizing a portion of the recirculation loop and releasing the pressure and thereby giving rise to shearing conditions in the wastewater.

8. The method of claim 1 wherein applying directed energy to the wastewater includes applying ultrasonic energy to the wastewater passing through the recirculation loop.

9. The method of claim 8 wherein applying ultrasonic energy to the wastewater includes directing sound energy through a portion of the recirculation loop which causes degradation of floc forming a part of the wastewater.

10. The method of claim 9 wherein the ultrasonic energy applied to the wastewater is typically about 20 kHz.

11. The method of claim 1 wherein applying directed energy includes applying two or more of mechanical shear energy, hydraulic shear energy, or ultrasonic energy to the wastewater passing through the recirculation system.

12. The method of claim 11 wherein the recirculation loop includes an inlet and an outlet and wherein the applied energy directed to the wastewater is applied at a point between the inlet and outlet of the recirculation loop.

13. The method of claim 1 wherein the recirculation loop includes an inlet and an outlet and wherein the applied directed energy is applied between the inlet and outlets of the recirculation loop.

14. The method of claim 1 wherein measuring the odor potential of the sludge comprises volatizing any sulfur containing species from the sludge; retrieving a sample of the volatized sulfur containing species; and analyzing the sample to determine the odor potential.

15. The method of claim 14 wherein the step of analyzing the sample comprises a spectral analysis.

16. The method of claim 14 wherein the step of analyzing the sample comprises correlating a concentration of volatized sulfur containing species to the odor potential.

17. A method of digesting sludge and increasing methane gas production and increasing the reduction of volatile solids, comprising:
a. directing the sludge to an anaerobic digester;
b. directing sludge from the anaerobic digester to a recirculation loop, through the recirculation loop and back to the anaerobic digester, and continuing to recirculate the sludge through the recirculation loop;
c. enhancing the efficiency of the anaerobic digester by increasing methane gas production and increasing the reduction of volatile solids by degradating or disintegrating constituent particles that form the sludge;
d. wherein degradating or disintegrating the constituent particles of sludge includes imparting directed energy to the sludge at one or more selected points in the recirculation loop as the sludge is being recirculated therethrough; and
e. measuring an odor potential of the sludge and controlling the application of the directed energy to the sludge as a function of the measured odor potential.

18. The method of claim 17 wherein imparting directed energy to the sludge in the recirculation loop includes directing mechanical shear energy, hydraulic shear energy, or ultrasonic energy to the sludge as the sludge moves through the recirculation loop.

19. The method of claim 18 wherein imparting the directed energy comprises two of the mechanical shear energy, hydraulic shear energy or the ultrasonic energy.

20. A wastewater treatment system for treating sludge and for enhancing the production of methane gas and increasing the reduction of volatile solids comprising:
a. an anaerobic digester;
b. a recirculation loop operatively associated with the anaerobic digester for recycling sludge contained within the anaerobic digester;
c. the recirculation loop including an inlet and an outlet and operative to receive sludge from the anaerobic digester and to circulate the sludge through the circulation loop and back to the anaerobic digester;
d. means associated with the recirculation loop for imparting directed energy to the sludge passing through the recirculation loop and for degrading or disintegrating constituent portions of the sludge; and
e. means for measuring the odor potential of the sludge and controlling the application of the directed energy to the sludge as a function of the measured odor potential.

21. The wastewater treatment system of claim 20 wherein the means for imparting directed energy includes a mechanical shear energy system.

22. The wastewater treatment system of claim 20 wherein the mechanical shear energy system utilizes glass or metallic beads.

23. The wastewater treatment system of claim 20 wherein the mechanical shear energy system shreds or pulverizes constituents of the sludge.

24. The wastewater treatment system of claim 20 wherein the means for imparting directed energy to the sludge comprises a hydraulic shear energy system.

25. The wastewater treatment system of claim 24 wherein the hydraulic shear energy system includes an orifice disposed in the recirculation loop and wherein the system is operative to provide a pressure differential across the orifice.

26. The wastewater treatment system of claim 24 wherein the hydraulic shear energy system provides a cavitation-induced shear conditions within the recirculation toop.

27. The wastewater treatment system of claim 20 wherein the means for imparting directed energy to the sludge comprises an ultrasonic energy system.

28. The wastewater treatment system of claim 27 wherein the ultrasonic energy system induces cavitation within the recirculation loop and is operative to degrade or disintegrate constituents of the sludge.

29. The wastewater treatment system of claim 20 wherein the means for imparting directed energy to the sludge includes any two of the following energy systems: a mechanical shear energy system, a hydraulic shear energy system, and an ultrasonic energy system.

30. The wastewater treatment system of claim 20 wherein the means for imparting directed energy to the sludge is controllable such that the energy applied to the sludge can be varied.

* * * * *